United States Patent
Nakamura

(10) Patent No.: US 6,721,818 B1
(45) Date of Patent: Apr. 13, 2004

(54) ELECTRONIC DEVICE THAT STORES INFORMATION ON ITS LOCATION BASED ON INFORMATION OBTAINED FROM A NODE

(75) Inventor: Atsushi Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/379,919

(22) Filed: Aug. 24, 1999

(30) Foreign Application Priority Data

Aug. 24, 1998 (JP) ............................................ 10-237075

(51) Int. Cl.⁷ ............................. G06F 13/14; G06F 3/00
(52) U.S. Cl. ............................. 710/9; 710/10; 710/15; 710/104; 713/1; 709/224
(58) Field of Search ............................. 710/9, 10, 15, 710/104; 713/1; 709/224

(56) References Cited

U.S. PATENT DOCUMENTS

| | | | | |
|---|---|---|---|---|
| 5,221,925 A | * | 6/1993 | Cross | 340/988 |
| 5,305,013 A | * | 4/1994 | Daniels | 345/82 |
| 5,434,775 A | * | 7/1995 | Sims et al. | 364/403 |
| 5,534,887 A | * | 7/1996 | Bates et al. | 345/120 |
| 5,598,143 A | * | 1/1997 | Wentz | 340/539 |
| 5,631,882 A | * | 5/1997 | Mascenik | 369/30 |
| 5,666,557 A | * | 9/1997 | Cassidy et al. | 710/8 |
| 5,673,023 A | * | 9/1997 | Smith | 340/571 |
| 5,815,080 A | * | 9/1998 | Taguchi | 340/635 |
| 5,826,103 A | * | 10/1998 | Whittaker | 710/8 |
| 5,880,955 A | * | 3/1999 | Matoba et al. | 364/188 |
| 5,910,776 A | * | 6/1999 | Black | 340/825.35 |
| 6,044,411 A | * | 3/2000 | Berglund et al. | 710/9 |
| 6,070,078 A | * | 5/2000 | Camp, Jr. et al. | 455/456 |
| 6,101,559 A | * | 8/2000 | Schultz et al. | 710/15 |
| 6,169,902 B1 | * | 1/2001 | Kawamoto | 455/456 |
| 6,236,933 B1 | * | 5/2001 | Lang | 701/117 |
| 6,359,711 B1 | * | 3/2002 | Cole et al. | 359/118 |
| 6,397,249 B1 | * | 5/2002 | Cromer et al. | 709/224 |
| 6,462,656 B2 | * | 10/2002 | Ulrich et al. | 340/539 |

* cited by examiner

Primary Examiner—Abdelmoniem Elamin
(74) Attorney, Agent, or Firm—Fitzpatrick, Cella, Harper & Scinto

(57) ABSTRACT

In a bus network wherein a plurality of devices are interconnected, the devices share an address space that they can access. The position information describing the actual locations of the devices, and the functional information for the devices are stored in a predetermined area in the address space. When a specific device on the network displays information in the address space for each device, a user can easily specify the actual location of a desired device that is connected to the network, and can also identify the functional information for the device.

7 Claims, 26 Drawing Sheets

■ : OUTLET
------- : HOME NETWORK OUTLET IEEE1394 CONNECTION
———— : DEVICE TO OUTLET IEEE1394 CONNECTION

FIG. 7

CSR CORE · REGISTER

| OFFSET (HEXADECIMAL) | REGISTER NAME | FUNCTION |
|---|---|---|
| 000 | STATE_CLEAR | INFORMATION OF STATUS AND CONTROL |
| 004 | STATE_SET | INFORMATION INDICATING WHETER STATE-CLEAR IS WRITABLE |
| 008 | NODE_IDS | BUS ID+NODE ID |
| 00C | RESET_START | RESET BUS BY WRITING THIS AREA |
| 010—014 | INDIRECT_ADDRESS, INDIRECT_DATA | REGISTER FOR ACCESSING ROM LARGER THAN 1K |
| 018—01C | SPLIT_TIMEOUT | VALUE OF TIMER DETECTING TIMEOUT OF SPLIT-TRANSACTION |
| 020—02C | ARGUMENT, TEST_START, TEST_STATUS | REGISTER FOR DIAGNOSIS |
| 030—04C | UNITS_BASE, UNITS_BOUND, MEMORY_BASE, MEMORY_BOUND | NOT MOUNTED IN IEEE 1394 |
| 050—054 | INTERRUPT_TARGET, INTERRUPT_MASK | INTERRUPTION NOTIFICATION REGISTER |
| 058—07C | CLOCK_VALUE, CLOCK_TICK_PERIOD, CLOCK_STOROBE_ARRIVED, CLOCK_INFO | NOT MOUNTED IN IEEE 1394 |
| 080—0FC | MESSAGE_REQUEST, MESSAGE_RESPONSE | MESSAGE NOTIFICATION REGISTER |
| 100—17C | | RESERVATION |
| 180—1FC | ERROR_LOG_BUFFER | RESERVATION FOR IEEE 1394 |

FIG. 8

SERIAL · BUS · REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONOUS |
| 208 | POWER_FAIL_IMMINENT | REGISTER RELATING TO POWER SUPPLY |
| 20C | POWER_SOURCE | |
| 210 | BUSY_TIMEOUT | CONTROL RE-TRY OF TRANSACTION LAYER |
| 214—218 | | RESERVATION |
| 21C | BUS_MANAGER_ID | NODE ID OF BUS MANAGER |
| 220 | BAND WIDTH_AVAILABLE | MANAGE BAND OF ISOCHRONOUS TRANSFER |
| 224—228 | CHANNELS_AVAILABLE | MANAGE CHANNEL NUMBER OF ISOCHRONOUS TRANSFER |
| 22C | MAINT_CONTROL | REGISTER FOR DIAGNOSIS |
| 230 | MAINT_UTILITY | |
| 234—3FC | | RESERVATION |

FIG. 9

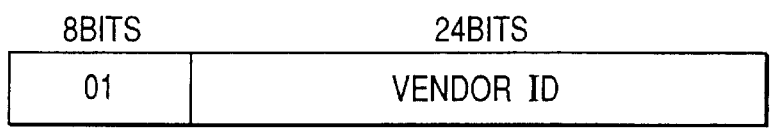

CONFIGURATION ROM OF MINIMUM FORMAT (CABLE CROSS SECTIONAL VIEW)

(EXCLUSIVE-OR SIGNAL OF DATA AND STROBE)

PACKET OF ISOCHRONOUS · DATA

FIG. 31

| NODE ID | FUNCTION | ROOM INDEX | DETAILS |
|---|---|---|---|
| 0 | printer | A1 | C COMPANY, MODEL BJC777, SBP-2, DPP |
| 1 | scanner | A1 | C COMPANY, MODEL SC10, SBP-2, DPP |
| 2 | VTR | C1 | S COMPANY, MODEL VTR300, AV/C |
| 3 | outlet | C1 | ⋮ |
| 4 | printer | D1 | C COMPANY, MODEL BJC777, SBP-2 |
| 5 | outlet | D1 | ⋮ |
| 6 | outlet | B2 | ⋮ |
| 7 | VTR | B1 | S COMPANY, MODEL VTR300, AV/C |
| 8 | outlet | B1 | ⋮ |
| 9 | outlet | A1 | |
| 10 | PC | A1 | I COMPANY, MODEL PC200, SBP-2, AV/C |

ELECTRONIC DEVICE THAT STORES INFORMATION ON ITS LOCATION BASED ON INFORMATION OBTAINED FROM A NODE

BACKGROUND OF THE INVENTION

1. Field of the Invention

The present invention relates to an electronic apparatus, an information processing method, a digital interface, an information management method and a storage medium, and in particular to a communication network wherein a plurality of devices can be interconnected.

2. Related Background Art

Conventionally, in a communication network using a digital interface, such as a centronics interface, a host and a device are connected to each other with a one-to-one correspondence. In such a network, if the number of devices to be connected is increased, a great load may be imposed on the host.

In order to resolve this problem, a bus network has been proposed wherein a plurality of devices (e.g., a digital video, a digital camera, a scanner and a host computer) can be interconnected.

In this bus network, generally, unique ID information is provided for the individual devices so that each of the devices can identify the others.

The ID information includes, for example, a unique maker ID for a device manufacturer, and a device ID (e.g., a serial No.) that the maker arbitrarily assigns to the device.

By employing the specified ID information, each device in the bus network is able to specifically identify each of the other devices.

However, the following problem is encountered when the bus network described above is employed.

When, for example, the ID information is to be displayed on the screen of a specific device, it is difficult for a user to ascertain the actual location of each device. Especially when a plurality of the same kind of devices manufactured by the same maker are connected to the network, a user must determine where a desired device is actually located by examining the device ID included in the ID information.

Furthermore, when the interconnection of the devices can be graphically displayed with the ID information, a user must ascertain where a desired device is actually located while alternately confirming the connection status of the devices and how they are connected on the display screen. Especially when the network in question is large and a number of the individual devices are located outside the range of the sight of the user, it is very difficult for the user to ascertain the actual location of a desired device.

SUMMARY OF THE INVENTION

An object of the present invention is to solve the above described problems.

Another object of the present invention is to provide a technique, for an electronic apparatus, an information processing method, a digital interface, an information management method and a storage medium, whereby the actual location of a desired device connected to a network can be easily determined.

As a preferred embodiment for such objects, an electronic apparatus according to the present invention comprises:

a storage unit, for storing inherent information for the electronic apparatus, including, at the least, position information specifically designating the location of the electronic apparatus; and a transmission unit, for transmitting the contents of the storage means via a bus network.

As another embodiment, an information processing method according to the present invention comprises the steps of:

storing, at the least, position information specifically identifying the location of an electronic apparatus in a memory for storing inherent information for the electronic apparatus; and transmitting the contents of the memory via a bus network.

As an additional embodiment, a digital interface according to the present invention comprises:

a storage unit for storing inherent information concerning an electronic apparatus incorporating the digital interface, the inherent information including, at the least, position information specifically identifying the location of the electronic apparatus; and a transmission unit for transmitting the contents of the storage means via a bus network.

As a further embodiment, an information management method according to the present invention comprises the steps of:

writing inherent information for an electronic apparatus in a memory of the electronic apparatus, the inherent information including, at the least, position information specifically identifying the location of the electronic apparatus; and transmitting the contents of the memory via a bus network.

As yet one more embodiment, a storage medium according to the present invention comprises:

a first area to be managed based on an address area used in common by a plurality of electronic apparatuses connected to a bus network; and a second area for the storage of inherent information for each of the electronic apparatuses for which the storage medium is provided, the inherent information including, at the least, position information specifically identifying the locations of the electronic apparatuses.

As yet another embodiment, an electronic apparatus according to the present invention comprises:

a requesting unit, for querying another electronic apparatus connected to a bus network to obtain inherent information concerning the queried electronic apparatus, including, at the least, position information specifically identifying the location of the queried electronic apparatus; and a control unit, for displaying, on a display device, a connection relationship for the bus network and the inherent information for the queried electronic apparatus.

As yet an additional embodiment, an information processing method according to the present invention comprises the steps of:

requesting that a specific electronic apparatus connected to a bus network provide inherent information for a different electronic apparatus, including, at the least, position information specifically identifying the location of the different electronic apparatus; and displaying, on a display device, a connection relationship on the bus network and the inherent information for the different electronic apparatus.

Still other objects of the present invention, and the advantages thereof, will become fully apparent during the course of the following detailed description of the embodiment.

BRIEF DESCRIPTION OF THE DRAWINGS

FIG. 7 is a diagram showing addresses and the functions of data stored in a CSR core register;

FIG. 8 is a diagram showing addresses and the functions of data stored in a serial bus register;

FIG. 9 is a diagram showing a configuration ROM for the minimum format;

FIG. 31 is a diagram showing the contents of a correlation table according to the embodiment.

DETAILED DESCRIPTION OF THE PREFERRED EMBODIMENT

The preferred embodiment of the present invention will hereinafter be described in detail while referring to the accompanying drawings.

Figure 1:
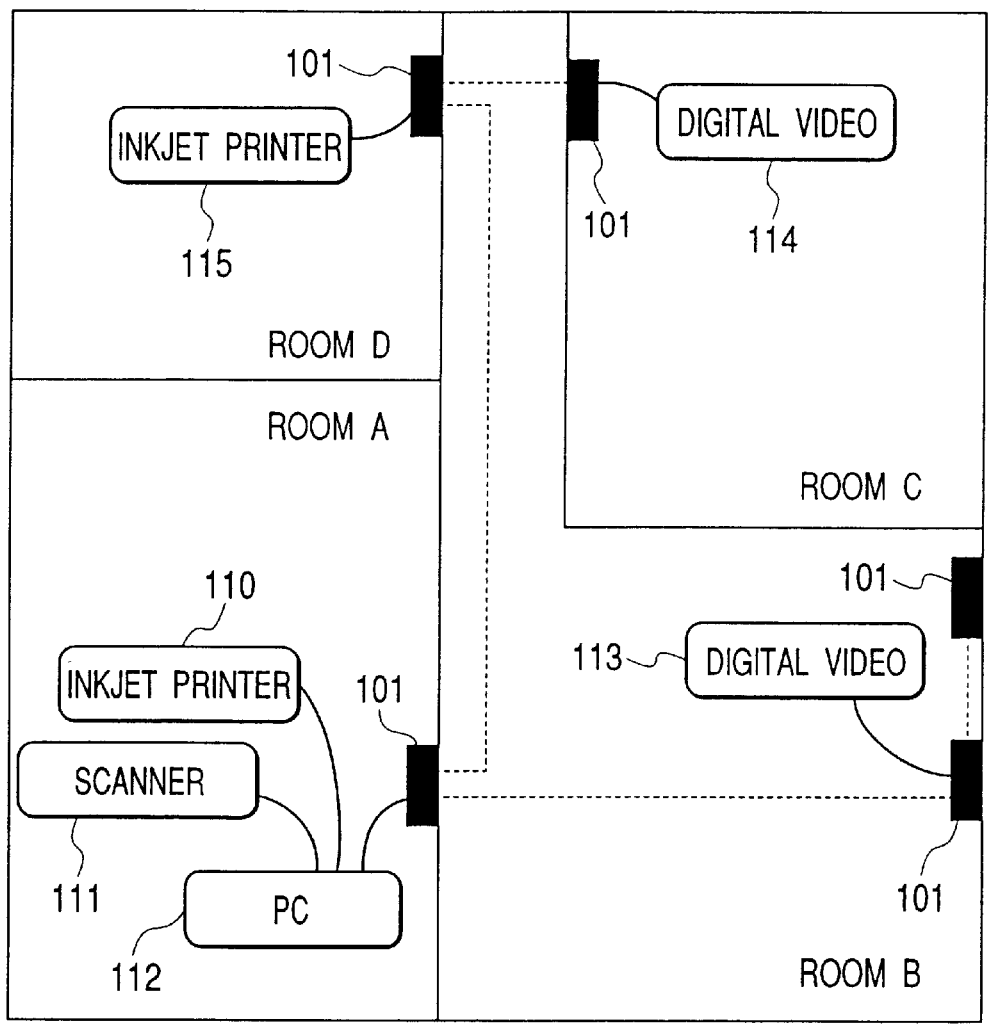
FIG. 1 is a diagram illustrating the configuration of a home network according to one embodiment of the present invention.

FIG. 1 is a diagram showing the configuration of a home network to which a bus network for this embodiment is applied.

In FIG. 1, an outlet 101, including a plurality of connectors, is prepared for each room. Each outlet 101 includes a digital interface that conforms to the IEEE1394–1995 standard (hereinafter referred to as the IEEE1394 standard). In this embodiment, a serial bus communication cable conforming to the IEEE1394 standard (hereinafter referred to as a 1394 cable) is employed to connect the outlets 101, so that a home network is formed for which communication among the rooms is enabled.

The outlets 101 mounted in the individual rooms have a repeater function, and relay data transmitted by devices that are located in different rooms.

The devices located in each of the rooms include a digital interface conforming to the IEEE1394 standard (hereinafter referred to as a 1394 interface), and are connected together by the 1394 cable.

In FIG. 1, an inkjet printer 110, a scanner 111 and a personal computer (PC) 112 are located in room A. A digital video 113 is located in room B; a digital video 114 is located in room C, and an inkjet printer 115 is located in room D.

The two digital videos 113 and 114 are the same model, and the two inkjet printers 110 and 115 are the same model, and in each case are produced by the same maker.

In this embodiment, in order to support the user's network management, the PC 112 employs a predetermined application to display as a device map, on the monitor, the connection states and locations of the devices connected to the home network, and information concerning :the functions supported by the devices.

In the home network in FIG. 1, digital data, such as print data (e.g., text data or static image data) transmitted by the PC 112 to the inkjet printer 110, static image data transmitted by the scanner 111 to the PC 112, static image data transmitted by the scanner 111 directly to the inkjet printer 115, moving image data transmitted by the digital video 114 to the PC 112, static image data transmitted by the digital video 113 directly to the printer 110 and moving image data and audio data transmitted by the digital video 113 to the digital video 114, are transmitted in a time sharing manner.

An explanation will now be given for the basic function of the 1394 interface that makes the deployment of the home network of this embodiment possible. The IEEE1394–1995 standard is described in detail in "IEEE Standard for a High Performance Serial Bus", published by IEEE (the Institute of Electrical and Electronics Engineers. Inc.) on Aug. 30, 1996.

(1) Outline

Figure 2:
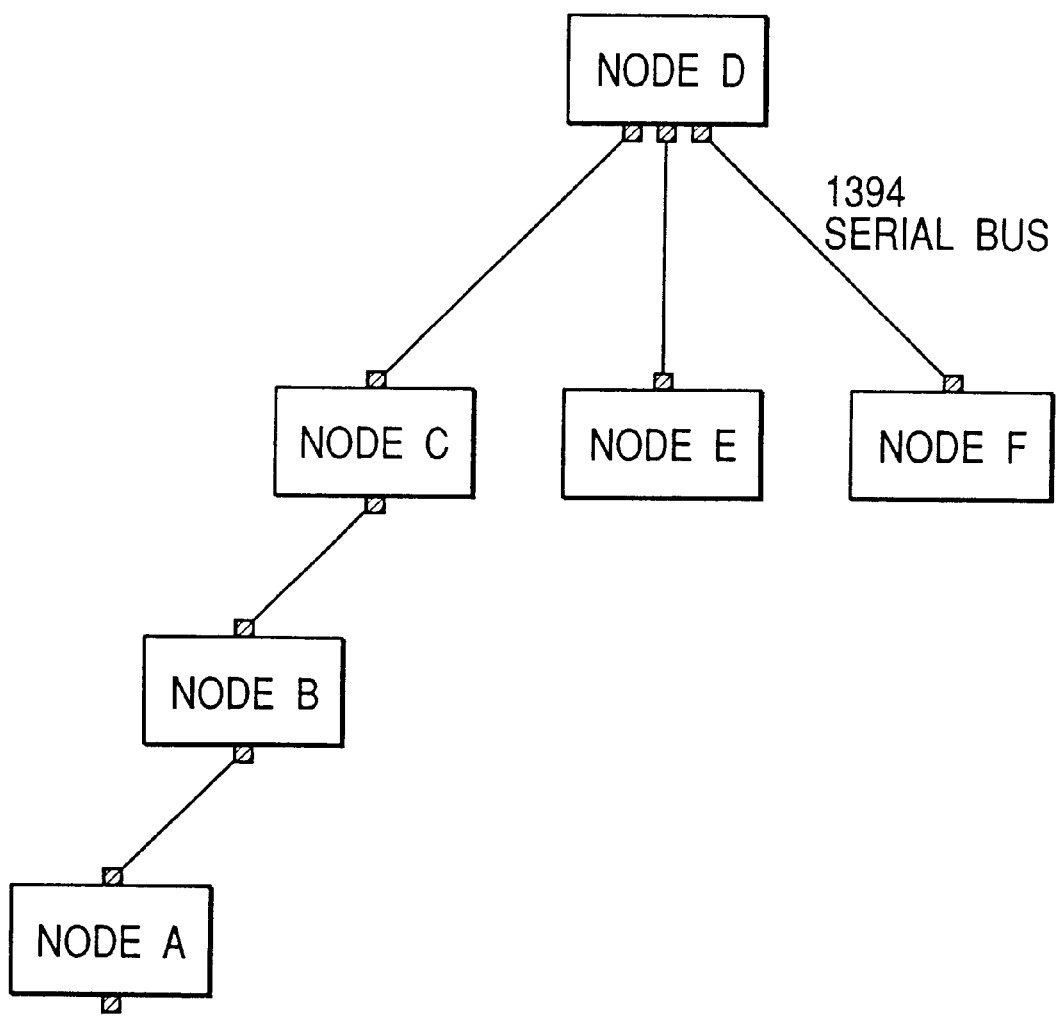
FIG. 2 is a diagram showing an example configuration of a 1394 network.

FIG. 2 is a diagram illustrating a communication system (hereinafter referred to as a 1394 network) comprising devices (hereinafter called nodes) and 1394 interfaces. The 1394 network is a bus network employed for the communication of serial data.

In FIG. 2, nodes A to H are interconnected by a communication table conforming to the IEEE1394 standard. The nodes A to H are, for example, a PC (Personal Computer), a digital VTR (Video Tape Recorder), a DVD (Digital Video Disc) player, a digital camera, a hard disk and a monitor.

The connection method used for the 1394 network corresponds to a combined daisy chain and node branching method, and permits connections to be made with a great degree of freedom.

In the 1394 network, when a currently employed device is removed, a new device is added, or a currently employed device is turned on or off, the bus is automatically reset. By resetting the bus, the 1394 network can automatically recognize a new connection state, and can allocate ID information for individual devices. With this function, the 1394 network is constantly aware of the current connection configuration.

Furthermore, the 1394 network includes a function for relaying data transmitted by various devices. With this function, all the devices can identify the operating state of the bus.

The 1394 network also has a function called Plug&Play. With this function, the 1394 network can automatically identify a connected device, without all the devices being turned off.

In addition, the 1394 network can cope with data transfer speeds of 100/200/400 Mbps. Since a device having a higher data transfer speed can support a lower data transfer speed, devices having different data transfer speeds can be connected together.

Further, the 1394 network can cope with two different data transmission modes (i.e., the asynchronous transmission mode and the isochronous transmission mode).

The asynchronous transmission mode is effective for the transmission of data that are to be transmitted asynchronously, as needed (i.e., control signals or file data). The isochronous transmission mode is effective for the transmission of predetermined amounts of data for the which sequential transmission at a constant data transfer rate is requested (i.e., video data or audio data).

The asynchronous transmission mode and the isochronous transmission mode can coexist in each communication cycle (normally one communication cycle is 125 $\mu$m). The two transmission modes are employed after the transmission of a cycle start packet (hereinafter referred to as a CSP) that indicates the start of a cycle.

In each communication cycle, the isochronous transmission mode is employed before the asynchronous transmission mode. Thus, a transmission band for the employment in each communication cycle of the isochronous transmission mode is ensured.

(2) Architecture

The components of the 1394 interface will now be described while referring to FIG. 3.

The 1394 interface is functionally constituted by a plurality of layers. In FIG. 3, the 1394 interface is connected to a 1394 interface for another node via a communication cable 301 that conforms to the IEEE1394 standard. The 1394 interface includes at least one communication port 302, which is connected to a physical layer 303 included in a hardware section.

Figure 3:
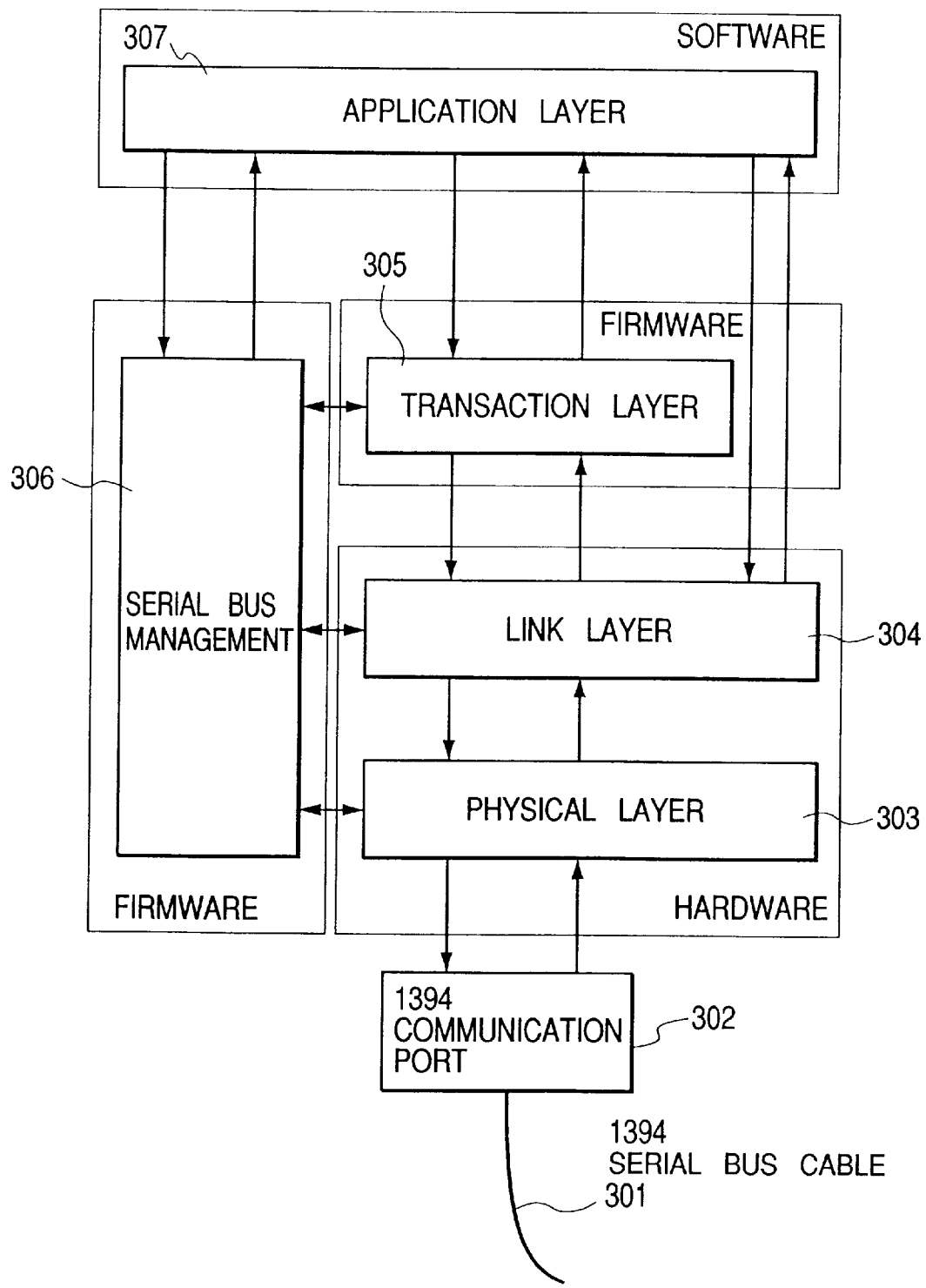
FIG. 3 is a diagram for explaining the components of a 1394 interface.

In FIG. 3, the hardware section includes the physical layer 303 and a link layer 304. The physical layer 303 detects a physical or electrical interface with another node and bus resettings, performs associated processing, encodes or decodes an input or output signal, and arbitrates the right of use of a bus. The link layer 304 generates and transmits or receives communication packets, and controls a cycle timer.

In FIG. 3, a firmware section includes a transaction layer 305 and a serial bus management portion 306. The transaction layer 305 manages the asynchronous transmission mode and provides various types of transactions (read, write and lock transactions). Based on the CSR architecture that will be described later, the serial bus management portion 306 provides functions for controlling a local node, managing the connection state of the local node, ID information for the local node and the serial bus network resources.

The hardware section and the firmware section substantially constitute the 1394 interface, the basic structure of which is specified by the IEEE1394 standard.

An application layer 307, the constitution of which differs depending on the application software that is to be employed, included in a software section controls the communication of data across the network. For example, the communication of moving image data of digital VTR is specified by a communication protocol, such as the AV/C protocol.

(2-1) Link Layer 304

Figure 4:
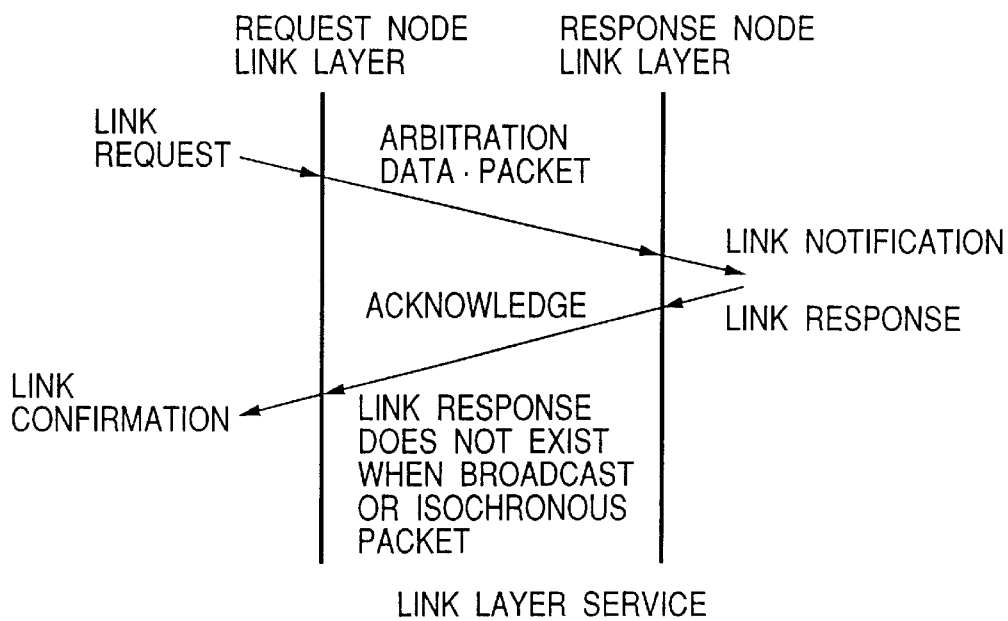
FIG. 4 is a diagram showing a service that can provide a link layer.

FIG. 4 is a diagram showing the services that the link layer 304 can provide. In FIG. 4, the link layer 304 provides the following four services: The transmission of (1) a link request (LK_DATA.request), for requesting a response node to transmit a predetermined packet; (2) a link notification (LK_DATA.indication), for notifying the response node of the reception of the predetermined packet; (3) a link response (LK_DATA.response), for indicating that an acknowledgement from the response node has been received; and (4) a link confirmation (LK_DATA.confirmation), for confirming the acknowledgement received from the request node. It should be noted that no link response (LK_DATA.response) is transmitted for a broadcast communication and for the transmission of an isochronous packet.

Based on the above services, the link layer 304 performs the functions of the two transmission modes described above, i.e., the asynchronous transmission modes and the isochronous transmission modes.

(2-2) Transaction Layer 305.

Figure 5:
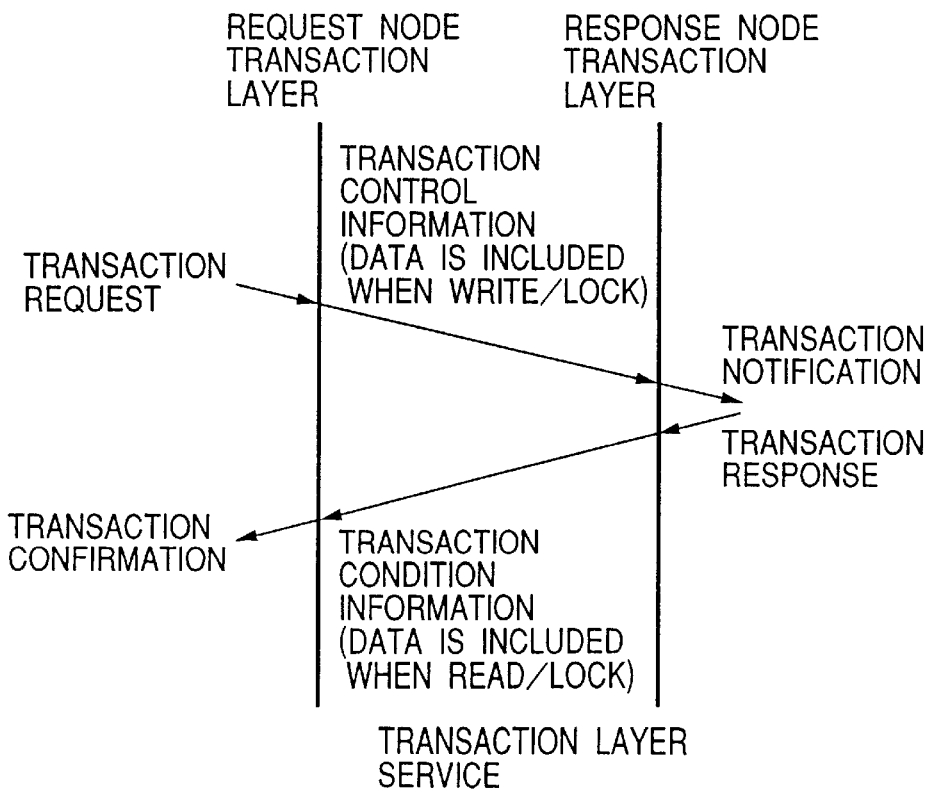
FIG. 5 is a diagram showing a service that can provide a transaction layer.

FIG. 5 is a diagram showing the services that the transaction layer 305 can provide. In FIG. 5, the transaction layer 305 provides the following four services: The transmission of (1) a transaction request (TR_DATA.request), for requesting from a response node a predetermined transaction; (2) a transaction notification (TR_DATA.indication), for notifying the response node of the reception of the transaction request; (3) a transaction response (TR_DATA.response), for indicating that status information (including data when a write or lock transaction is requested) from the response node has been received; and (4) a transaction confirmation (TR_DATA.confirmation), for confirming the status information from the request node.

Based on the above services, the transaction layer 305 manages the asynchronous transmission mode, and carries out the following three transactions, i.e., (1) a read transaction, (2) a write transaction and (3) a lock transaction.

During (1) a read transaction, the request node reads information stored at a specific address in the response node.

During (2) a write transaction, the request node writes predetermined information to a specific address in the response node.

During (3) lock transaction, the request node transmits reference data and update data to the response node and compares the reference node with information at a specific address in the response node, and in accordance with the results of the comparison, changes to update the information at the specific address.

(2-3) Serial Bus Management Portion 306

The serial bus management portion 306 provides the following three specific functions: (1) node control, (2) the isochronous resource manager (hereinafter referred to as a IRM), and (3) the bus manager.

The (1) node control controls the above described layers and manages the asynchronous transmission of data performed with another node.

The (2) IRM manages the isochronous transmission of data performed with another node. Specifically, management of the transmission band width and the information required for the allocation of a channel number is performed, and these data are transmitted to another node.

The IRM function is present only on the local bus, and is dynamically selected from the other nodes (nodes including the IRM function) at each bus reset. The IRM function may provide a part of the functions (management of a connection configuration, power and speed information) of the bus manager that will be described later.

The (3) bus manager includes the IRM function and provides a bus management function at a higher level than does the IRM. Specifically, the bus manager provides higher level management for a power source (management, for each node, of information concerning whether power can be supplied via a communication cable or whether the supply of power is required), higher level management of speed information (management of the maximum speed for the transmission of data between nodes), higher level management of the connection configuration (preparation of a topology map), and optimization of a bus based on these data. Further, the bus manager also has a function of transmitting these information items to another node.

The bus manger can provide a service for an application for controlling a serial bus network. The service includes the transmission of a serial bus control request (SB_CONTROL.request), a serial bus event control confirmation (SB_CONTROL.confirmation) and a serial bus event notification (SB_CONTROL.indication).

SB_CONTROL.request is a service that the application requests when the bus is reset. SB_CONTROL.confirmation is a service for confirming the transmission of the SB_CONTROL.request to the application. SB_CONTROL.indication is a service for transmitting notification of the application of an event that occurs asynchronously.

(3) Address Designation

Figure 6:
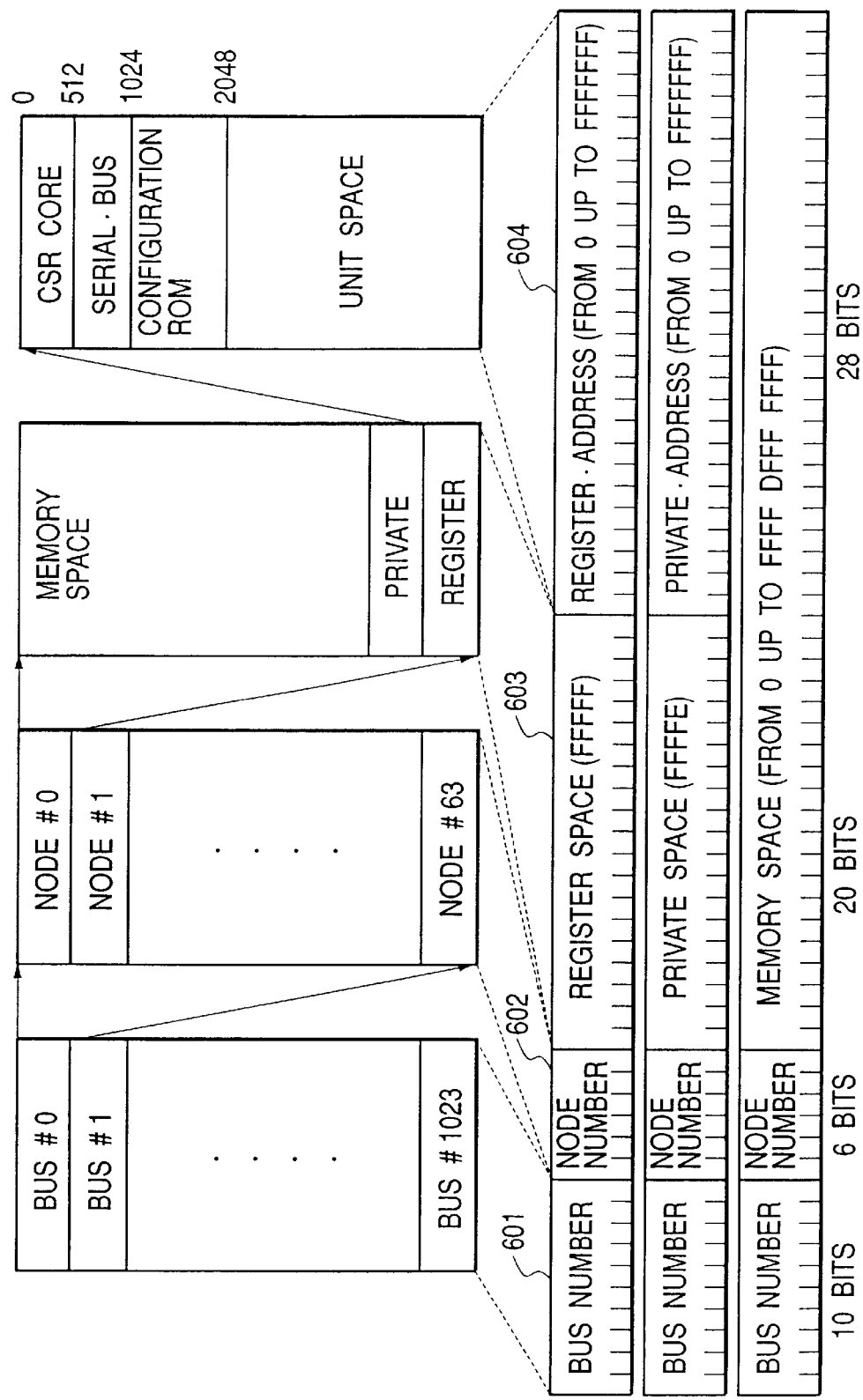
FIG. 6 is a diagram for explaining an address space for the 1394 interface.

FIG. 6 is a diagram for explaining an address space for the 1394 interface.

The 1394 interface defines an address space of 64 bits in accordance with the CSR (Command and Status Register) architecture conforming to the ISO/IEC 13213:1994.

In FIG. 6, a first field 601 of ten bits is used for an ID number for designating a predetermined bus, and a second field 602 of six bits is used for an ID number for designating a predetermined device (node). These upper 16 bits is called a node ID, and the nodes employ the node ID to identify the other nodes. Further, communication can be performed by a node when the other node has been identified by using this node ID.

A field consisting of the remaining 48 bits is used to designate an address space (256 M bytes) included in each node. In this field, a field 603 of 20 bits is used to designate a plurality of areas that form the address space.

In the field 603, the portion of 0 to 0xFFFFD is called a memory space, the portion 0xFFFFE is called a private space, which is an address that each node can freely use. The portion 0xFFFFE is called a register space, in which information used in common by the nodes connected to the bus is stored. The individual nodes can control communication with other nodes by using the information in the register space.

A last field 604 of 28 bits is used to designate an address at which information used in common by the nodes or inherent to the nodes is stored.

In the register space, for example, the first 512 bytes are used for the core (CSR core) register of the CSR architecture. The addresses of data stored in the CSR core register and functions are shown in FIG. 7. The offset in FIG. 7 is a relative position measured from 0xFFFFF0000000.

The next 512 bytes are used as a serial bus register. The addresses of data stored in the serial bus register and functions are shown in FIG. 8. The offset in FIG. 8 is a relative position measured from 0xFFFFF0000200.

The succeeding 1024 bytes are used as a configuration ROM.

The configuration ROM holds the minimum format and the general,format, and is located at 0xFFFFF0000400. The configuration ROM for the minimum format is shown in FIG. 9. In FIG. 9, a vender ID is a numerical value of 24 bits that is uniquely allocated to each vender by the IEEE.

Figures 10, 11:
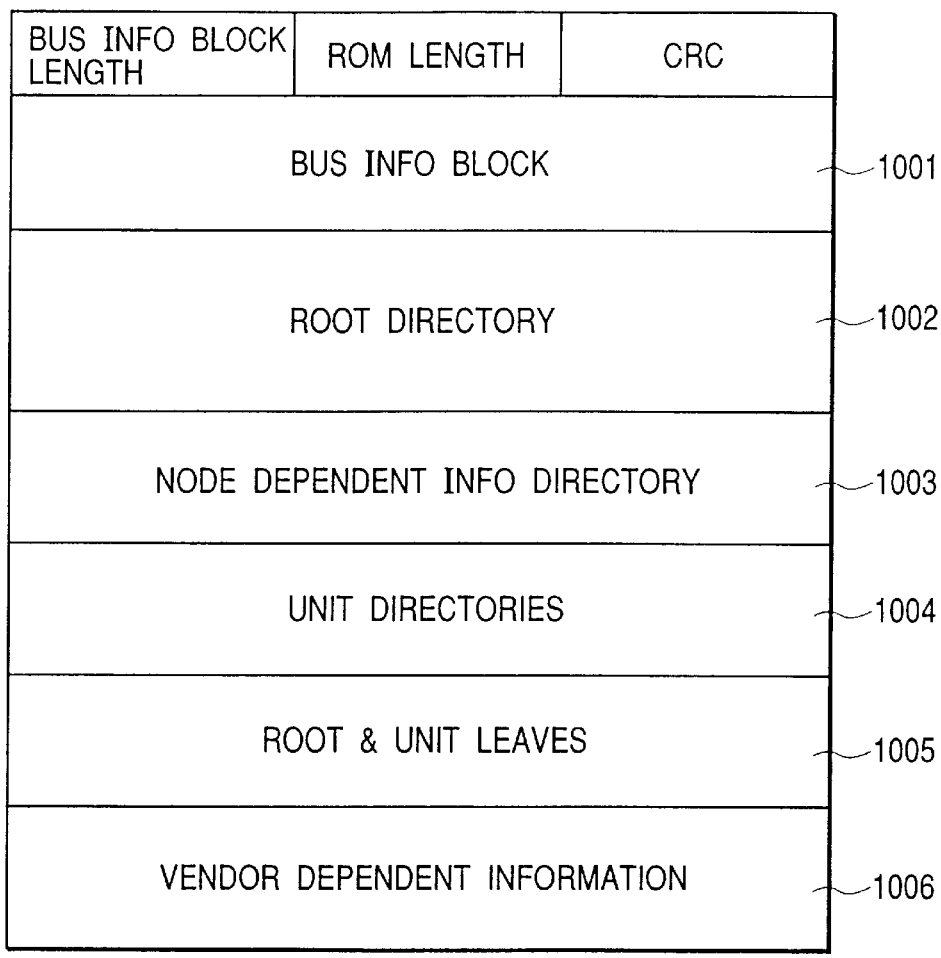
FIG. 10 is a diagram showing a configuration ROM for the general format.
FIG. 11 is a diagram showing addresses and the functions of data stored in a serial bus device register.

The configuration ROM for the general format is shown in FIG. 10. The above described vender ID is stored in a root directory 1002. A node unique ID, which is unique ID information for the identification of a node, can be stored in a bus info block 1001 and a root leaf 1005.

Regardless of the maker and the model, the node unique ID defines a unique ID with which one node can be specified. The node unique ID includes 64 bits; the upper 24 bits are used for the above described vender ID, and the lower 48 bits are used for information (e.g., the serial number of a node) that can be freely set by the maker who manufactures a node. The node unique ID is used when a specific node is recognized continuously before and after a bus reset.

In FIG. 10, information concerning the basic function of a node can be stored in the root directory 1002. The detailed functional information is stored in sub-directories (unit directories 1004) that are offset from the root directory 1002. For example, the information concerning the software unit supported by a node is stored in the unit directories 1004. Specifically, the data stored consists of information concerning a data transmission protocol for data communication between the nodes and a set of commands for defining a predetermined communication process.

In FIG. 10, information unique to a device can be stored in a node dependent info directory 1003. The node dependent info directory 1003 is offset from the root directory 1002.

Further, information unique to a vender who manufactures or sells a node can be stored in a vender dependent information area 1006.

The remaining area is called unit space in which an address is designated at which information unique to the individual nodes, i.e., identification data (the names of a company and a model) for each device and the employment condition, is stored. The addresses of data stored in the serial device register in the unit space and the functions are shown in FIG. 11. The offset in FIG. 1 11 is a relative position measured from 0xFFFFF0000800.

To simplify the design of a bus system of a different type, generally, the nodes should use only the first 2048 bytes in the register space. That is, it is preferable that 4096 bytes be allocated for the register space, and that this space be occupied by the CSR core register, the serial bus register, the configuration ROM and the first 2048 bytes of the unit space.

(4) Structure of the Communication Cable

Figure 12:
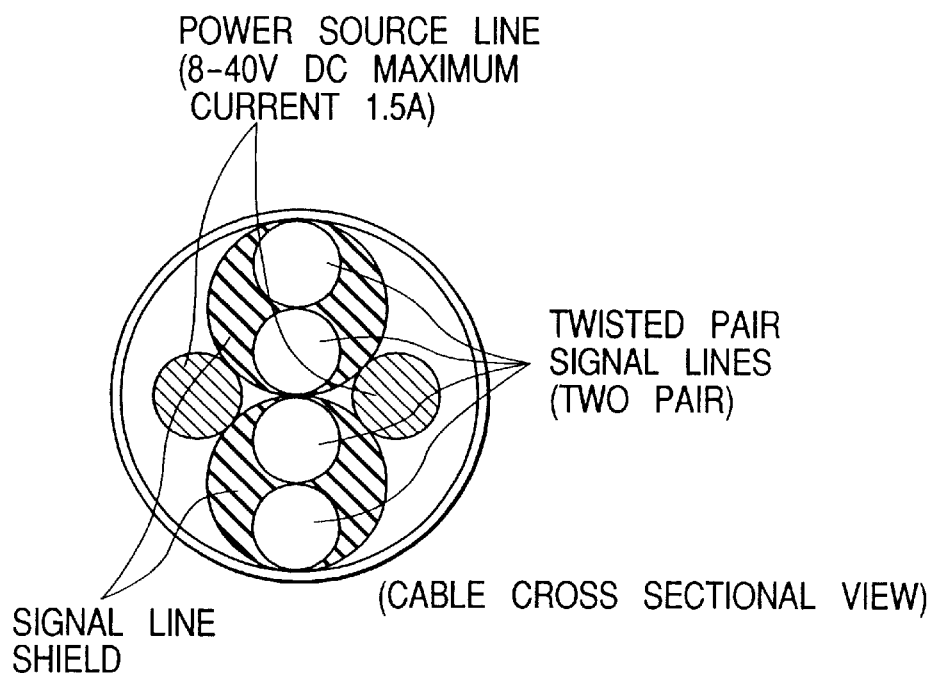
FIG. 12 is a cross-sectional view of a 1394 cable.

FIG. 12 is a cross-sectional view of a communication cable that conforms to the IEEE1394 standard.

The communication cable is constituted by two pairs of twisted pair signal lines and power source lines. Across the power source lines, the 1394 interface can supply power to a device for which the main power switch has been turned off, or to a device where the power has been reduced due to a power failure.

The voltage flowing across the power lines is defined as 8 to 40 V, and the current is defined as a maximum 1.5 A DC current.

A data signal coded by the DS-Link (Data/Strobe Link) coding method is transmitted along the two pairs of twisted pair signal lines.

Figure 13:
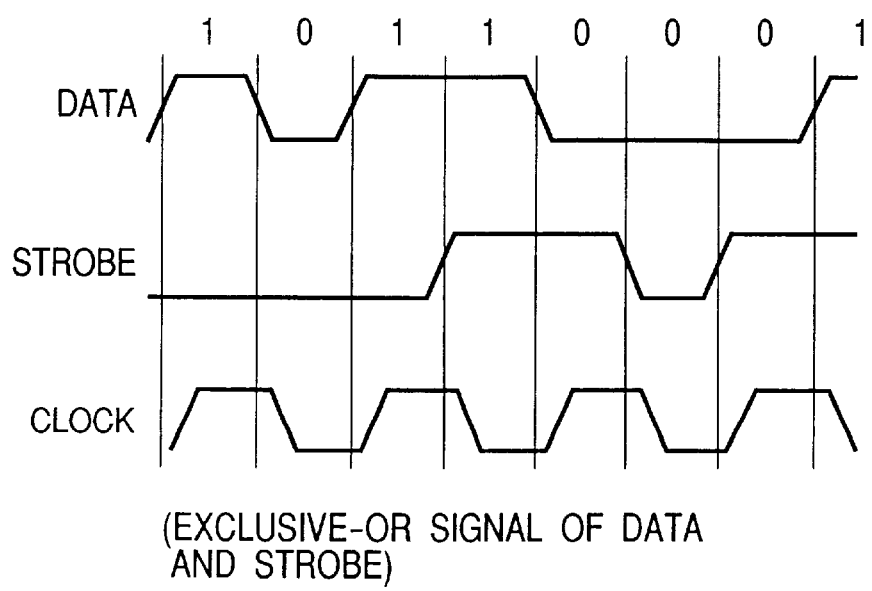
FIG. 13 is a diagram for explaining a DS-Link coding method.

FIG. 13 is a diagram for explaining the DS-Link coding method.

The DS-Link coding method is appropriate for fast serial data communication, and two pairs of twisted pair lines are required. One pair of twisted pair lines is used to transmit a data signal, and the other pair is used to transmit a strobe signal. The reception side obtains an exclusive-OR signal from the data signal and the strobe signal that are received along the two pairs of signal lines, and can reproduce a clock.

With the employment of the DS-Link coding method, the following results can be obtained by the 1394 interface: (1) the transfer efficiency is higher than the other coding method; (2) a PLL circuit is not required, and the circuit size of a controller LSI can be reduced; and (3) since information indicating the idle state need not be transmitted, a transceiver circuit is easily set to the sleep state and the consumption of power reduced.

(5) Bus Reset

The 1394 interface of each node can automatically detect a change in the connection configuration of the network. In this case, the 1394 network performs a process called a bus reset in accordance with the following procedures. It should be noted that the change in the connection configuration can be detected from a change in a bias voltage that is applied to a communication port of each node.

A node that has detected a change in the connection configuration of the network (e.g., the removal of a node and a change in the number of nodes resulting from the powering on or off of a node), or a node that may identify a new connection configuration, transmits a bus reset signal to the bus via the 1394 interface.

Upon receiving a bus reset signal, the 1394 interface of the pertinent node transmits a signal to its link layer 304 that a bus reset has occurred, and also transmits the received bus reset signal to another node. A node that receives the bus reset signal clears the currently identified connection configuration of the network and the node IDs assigned to the individual devices. When all the nodes have detected the bus reset signal, each node automatically performs the initialization process that is associated with a bus reset (i.e., the recognition of a new connection configuration and the assignment of new node IDs).

A bus reset can be activated not only when the above described change of the connection configuration is detected, but also when, under the control by the host, the application layer 307 issues a command directly to the physical layer 303.

When a bus reset is activated, data transmission is temporarily halted, and is resumed by a new network after the initialization associated with a bus reset has been performed.

(6) Process Sequence Following Start of Bus Reset

When a bus reset is started, the 1394 interface of each node automatically identifies a new connection recognition and assigns new node IDs.

The general process sequence beginning with a bus reset and continuing until the assignment of node IDs is completed, will now be described while referring to FIGS. 14 to 16.

Figure 14:
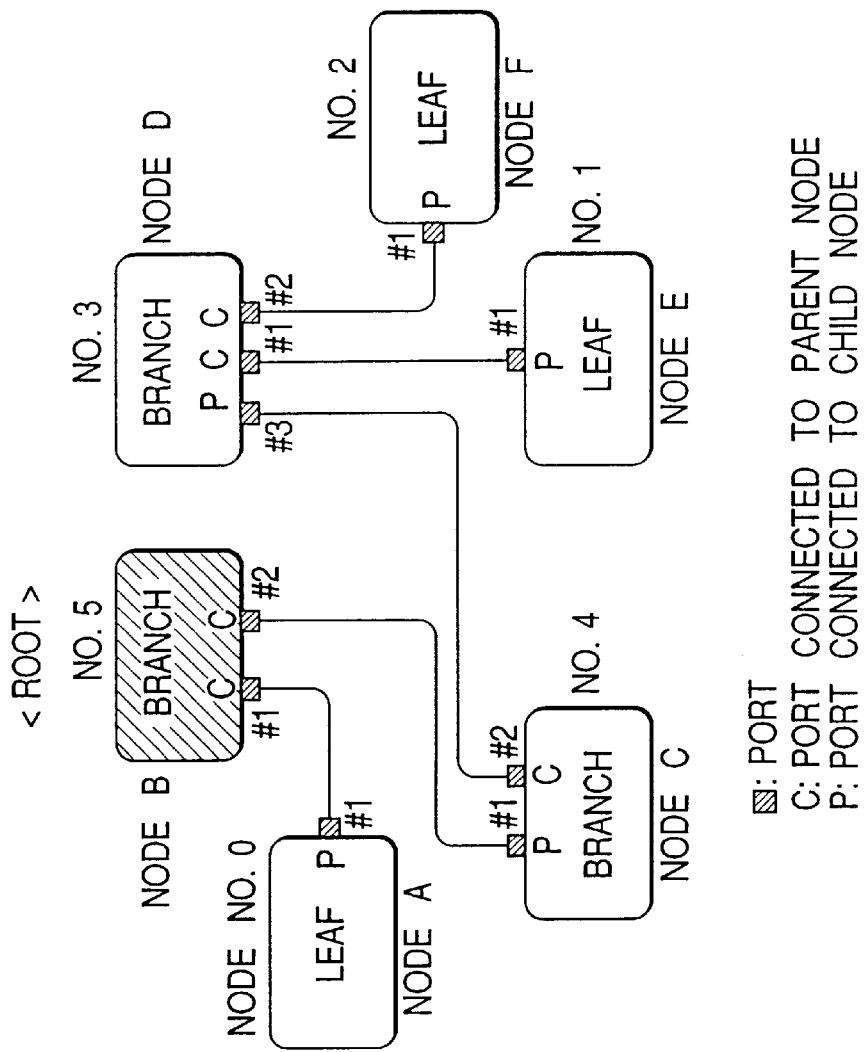
FIG. 14 is a diagram for explaining the states of nodes after a bus reset.

FIG. 14 is a diagram for explaining the state of the 1394 network in FIG. 2 after a bus reset has been initiated.

In FIG. 14, node A includes one communication port, node B includes two communication ports, node C includes two communication ports, node D includes three communication ports, node E includes one communication port, and node F includes one communication port. To identify the nodes, a port number is provided for the communication ports of the nodes.

The processing in FIG. 14, beginning with the bus reset and ending with the assignment of node IDs, will now be described while referring to the flowchart in FIG. 15.

Figure 15:
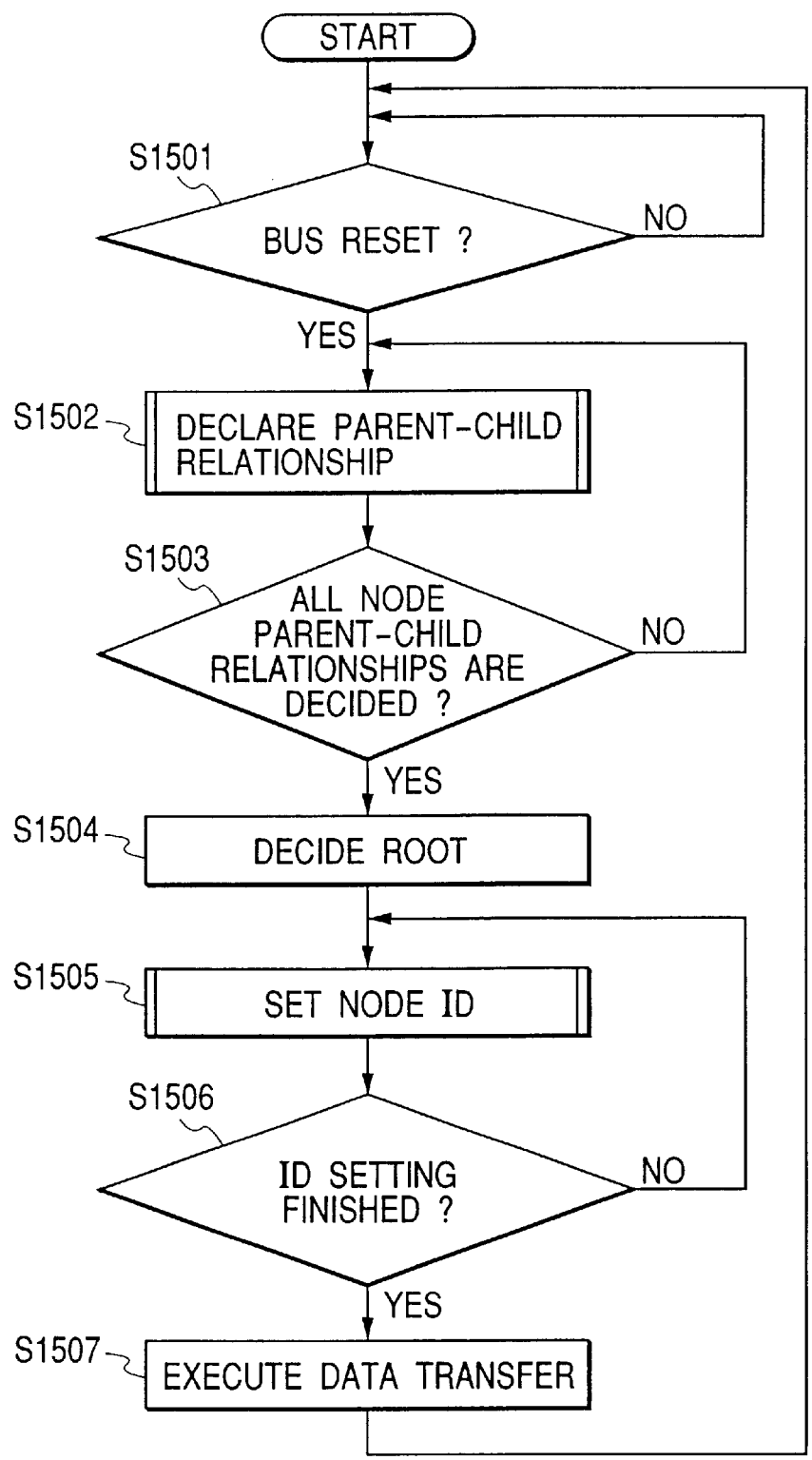
FIG. 15 is a flowchart for explaining the processing beginning at the start of the bus reset and ending with the allocation of a node ID.

In FIG. 15, nodes A to F, which constitute the 1394 network, constantly monitor the occurrence of a bus reset (step S1501). When a bus reset is output by the detection of a change in the connection configuration due to the turning on or off of the power for a node, the individual nodes perform the following processing.

When a bus reset has occurred, each node declares the parent-child relationship through their communication ports (step S1502).

Each of the nodes repeats the process at step S1502 until the parent-child relationship has been established: for all the nodes (step S1503).

When the parent-child relationships for all the nodes have been established, the 1394 network determines which node in the network, i.e., a root, will perform arbitration (step S1504).

After the root has been determined, sequentially, a node ID that differs for each mode is set automatically by the 1394 interfaces of the individual modes (step S1505).

The root continues the execution of the process at step S1505 until node IDs have been set for all the nodes (step S1506).

When node IDs have been set for all the nodes, the nodes begin an isochronous or an asynchronous transmission of data (step S1507).

After step S1507, the 1394 interface of each node again performs the monitoring for the occurrence of a bus reset. When a bus reset occurs, the 1394 interface performs the process beginning at step S1501.

Through the above described processing, each time a bus reset starts, the 1394 interface of each node can automatically identify a new connection configuration and assign new node IDs.

(7) Determination of Parent-child Relationship

The process at step S1502 in FIG. 15, i.e., the process for identifying the parent-child relationship existing between predetermined nodes, will now be described while referring to FIG. 16.

Figure 16:
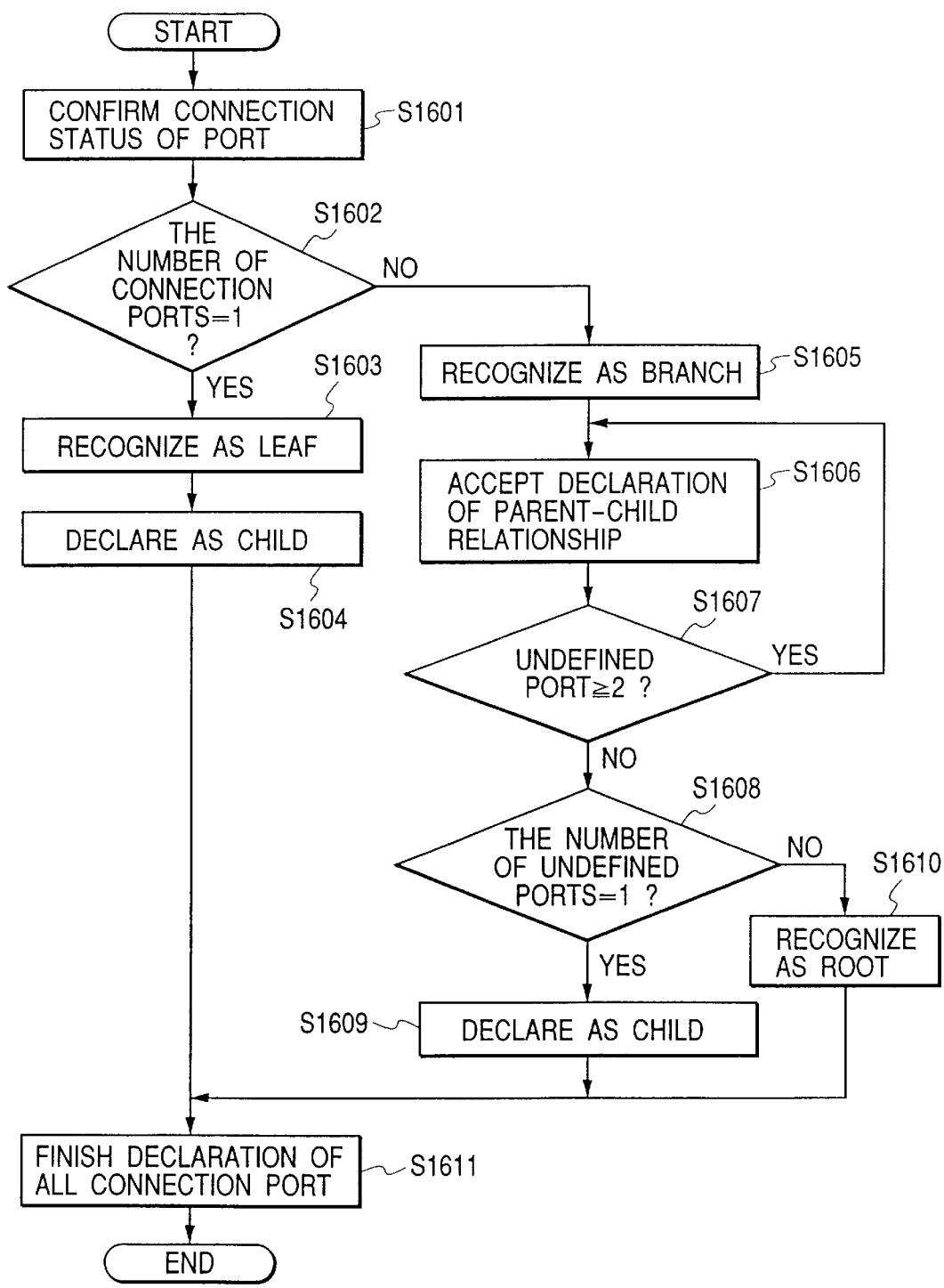
FIG. 16 is a flowchart for explaining the processing performed for the recognition of a parent-child relationship.

In FIG. 16, when a bus reset has occurred, nodes A to F of the 1394 network confirm the connection states (connected or disconnected) of their communication ports (step S1601).

After the connection states of the communication ports have been confirmed, the individual nodes count the number of communication ports (hereinafter referred to as connection ports) connected to the other nodes (step S1602).

When, as a result at step S1602, the number of connection ports is one, the pertinent node identifies itself as a leaf (step S1603). A leaf is a node connected only to one other node.

The leaf node issues a declaration that it is a child to the node that is connected to its connection port (step S1604). At this time, the leaf determines that the connection port is a parent port (a communication port connected to a parent node).

The declaration of the parent-child relationship is issued between the leaf and the branch, which are end terminals of the network, and then between the branches. The parent-child relationships among the nodes are determined beginning at the communication port from which the first declaration is issued. Further, for the nodes, a communication port from which a node issues a declaration that it is a child is identified as a parent port, and a communication port at which a declaration that a node is a child is received is identified as a child port (a communication port connected to a child node).

In FIG. 14, after nodes A, E and F identify themselves as leaves, they declare a parent-child relationship. As a result, a child-parent relationship is established between nodes A and B, between nodes E and D, and between nodes F and D.

When it is found at step S1602 that the number of connection ports is two or more, the pertinent node identifies itself as a branch (step S1605). A branch is a node connected to more than two nodes.

The branch node receives a declaration of a parent-child relationship from a node connected to a connection port (step S1606). A connection port at which a declaration is accepted is identified as a child port.

When one connection port is identified as a child port the branch determines whether there are two or more connection ports (e.e., undefined ports) for which a parent-child relationship has not yet been established (step S1607). When the number of undefined ports is two or more, the branch repeats the process at step S1606.

If at step S1607 only one undefined port is found, the branch identifies the undefined port as a child port, and declares itself as a child to the node that is connected to the pertinent port (steps S1608 and S1609).

If the branch is maintained as a child until the number of undefined ports is reduced to only one, it can not issue a declaration to another node. For example, in FIG. 14, nodes B, C and D identify themselves as branches, and receive declarations from a leaf or another branch. Node D declares a parent-child relationship with to node C after the parent-child relationship has been established between nodes D and E and between nodes D and F. Upon receiving the declaration, node C declares the parent-child relationship with node B.

If at step S1608 no undefined port is found, i.e., if all the connection ports of the branch are defined as parent ports, the pertinent branch identifies itself as a root (step S1610).

In FIG. 14, for example, node B, for which all the connection ports are child ports, is identified by the other nodes as a root and performs arbitration for the communications conducted across the 1394 network. In this embodiment, node B is determined to be a root; however, if the time at which node B declares the parent-child relationship is earlier than the time at which node C declares it, another node can be determined to be the root. That is, all the nodes can be defined as the root depending on the timing of declaration. Therefore, even in the same network configuration, the same node is not always defined as the root.

Since the parent-child relationships for all the nodes are declared through the above described processing, the individual nodes can ascertain that the connection configuration of the 1394 network is a rank structure (tree structure) (step S1611). In the tree structure, the highest rank is occupied by the parent nodes, in accordance with the parent-child relationships, while the lowest rank is occupied by the child nodes.

(8) Assignment of Node IDs

Figure 17:
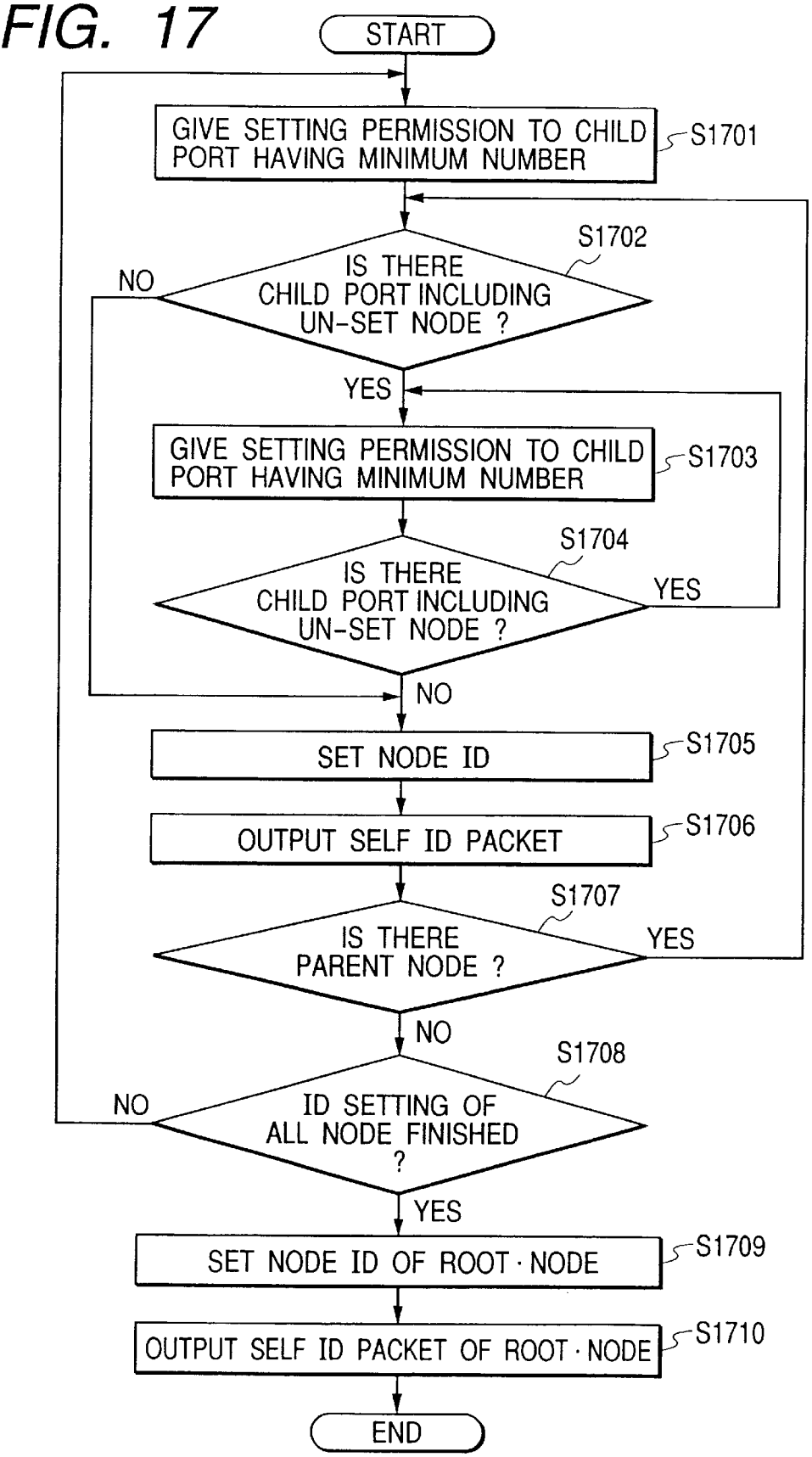
FIG. 17 is a flowchart for explaining the processing performed when allocating a node ID.

FIG. 17 is a detailed flowchart for the process at step S1505 in FIG. 15, i.e., the process for automatically assigning node IDs to nodes.

A node ID consists of a bus number and a node number. Hereinafter, the processing will be described for the assigning of node numbers along a local bus having a bus number that is common to all the nodes.

In FIG. 17, of the child ports to which are connected nodes for which node IDs have not yet been set, the root gives node ID setting permission to the communication port having the smallest number (step S1701).

The root designates a node ID for the node, connected to a child port, that has the smallest number, and selects the child port for which the node ID is to be set. Then, the root performs the same process for a child port having the next smallest number. When node IDs have been designated for all the nodes connected to the child ports, the node ID of the root is set. Basically, the numbers used for the node IDs are assigned in the order 0, 1, 2, . . . in consonance with the order of the leaves and the branches. The root, therefore, has the largest node number.

A node that obtains permission at step S1701 to set a node ID, first determines whether among its ports it has a child port to which is connected a child node for which a node ID has not yet been set (step S1702).

If, at step S1702, the node determines that it has a child port to which a child mode is connected for which a node ID has not yet been set, the node gives node ID setting permission to the child port that has the smallest number (step S1703).

The node that obtains the setting permission at step S1703, also determines whether among its ports it has a child port to which is connected a child node whose ID has not yet been set (step S1704).

If, at step S1704, the node determines it has a child port to which is connected a child mode for which a node ID has not yet been set, the node repeats the process at step S1703.

If, at step S1702 or S1704, the node finds that it does not have a child port to which is connected a child node for which a node ID has not yet been set, the node that received the setting permission sets a node ID for itself (step S1705).

The node for which the ID has been set broadcasts a self ID packet that includes its node number and information concerning the connection state of the communication port (step S1706).

The broadcast consists of the transmission of a communication packet by the pertinent node to an unspecified number of nodes that constitute the 1394 network. Upon receiving the self ID packet, each node can identify the node numbers assigned to the individual nodes, including the pertinent node.

In FIG. 14, for example, node B, which is the root, gives node ID setting permission to node A, which has the communication port having the smallest port number #1. Node A assigns node number No. 0 to itself, and sets for itself a node ID that includes a bus number. Further, node A broadcasts a self ID packet in which the node number is included.

Figure 18:
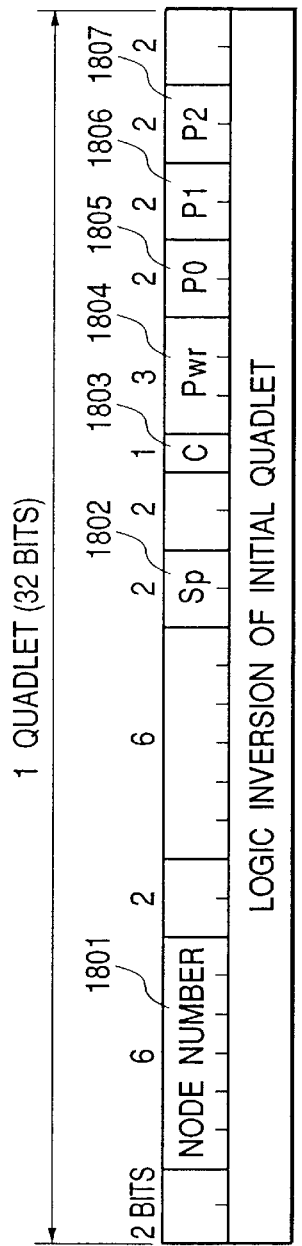
FIG. 18 is a diagram showing an example configuration of a self ID packet.

FIG. 18 is a diagram showing an example structure of a self ID packet.

In FIG. 18, a field 1801 is used to store the node number of a node that has transmitted a self ID packet. A field 1802 is used to store information concerning a transfer speed that can be coped with. A field 1803 is used to indicate the presence or absence of a bus management function (the presence or absence of the bus manager capability). And a field 1804 is used to store information concerning the consumption and the supply of power characteristics.

Furthermore, a field 1805 in FIG. 18 is used to store information (e.g., connection, disconnection and a parent-child relationship existing between communication ports) concerning the connection state of a communication port having #0 as its port number. A field 1806 is used to store information (e.g., connection, disconnection and a parent-child relationship existing between communication ports) concerning the connection state of a communication port having #1 as its port number. And a field 1807 is used to store information (e.g., connection, disconnection and a parent-child relationship existing between communication ports) concerning the connection state of a communication port having #2 as its port number.

When the node that transmitted a self ID packet can also serve as a bus manager, the contender bit stored in the field 1804 is set to "1". If the node can not function as a bus manager, the contender bit is set to "0".

The bus manager is a node that includes the following functions. By employing various data included in the self ID packet, the bus manager manages the power for a bus (manages, for each node, data as to whether power can be supplied via a communication cable and whether a supply of power is required), manages speed information (manages the maximum transfer speed between nodes in accordance with information concerning the transfer speed available for each node), manages the connection configuration of a network (topology map information), manages the connection configuration of a network in accordance with information for the parent-child relationships existing between communication ports), optimizes the bus based on the topology map, and provides these data to another node. Using these functions, the node that is a bus manager can manage the local bus.

A node whose node ID is set at step S1706 determines whether there is a parent node (step S1707). If there is a parent node, the parent node again performs the process at step S1702, and gives ID setting permission to a node whose ID has not been set.

If there is no parent node, it is assumed that the pertinent node is a root. The root then determines whether the node IDs have been set for the nodes that are connected to all the child ports (step S1708).

When, at step S1708, it is determined that the ID setting process has not yet been completed for all the nodes, the root gives ID setting permission to the child port having the smallest number selected from among the nodes, including a pertinent node (step S1701). Thereafter, the processing beginning with step S1702 is performed.

When the ID setting process has been completed for all the nodes, the root sets a node ID for itself (step S1709). Thereafter, the root broadcasts a self ID packet (step S1710).

Through the above described processing, the individual nodes along the local bus can automatically set node IDs.

After the node IDs have been set, the node having the largest node number serves as the manager if a plurality of nodes include the functions of the bus manager. That is, if the root has the largest node number along the local bus and can function as a bus manager, the root serves as the a bus manager.

If the root does not have such functions, a node having the second largest node number serves as the bus manager. A node that serves as a bus manger can be identified by examining a contender bit 1803 in a self ID packet that each node broadcasts.

(9) Arbitration

Figure 19A:
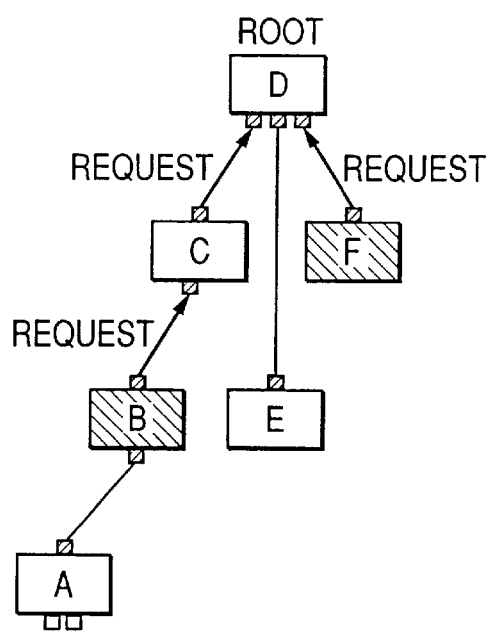
FIGS. 19A and 19B are diagrams for explaining an arbitration procedure.
Figure 19B:
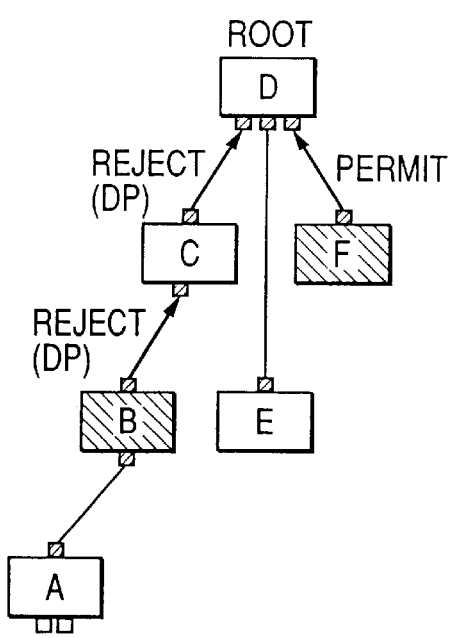

FIGS. 19A and 19B are diagrams for explaining arbitration performed in the 1394 network in FIG. 2.

Before the transmission of data, arbitration is performed to determine the right of use of the bus in the 1394 network. The 1394 network, which is a logical bus network, can transmit the same communication packet to all the nodes in the network by relaying a communication packet received from a specific node to another node. Therefore, in order to avoid communication packet collisions, arbitration is required. By applying arbitration, only one node can transmit a packet at a specific time.

FIG. 19A is a diagram for explaining an example wherein nodes B and F issue a request for the right to use of the bus. When the arbitration is begun, nodes B and F issue to their parent nodes a request for the right to use the bus. The parent node that receives the request from the node B, i.e., node C, relays the request to its parent node, i.e., node D. Finally, this request is transmitted to the root (node D) that performs the arbitration process.

Upon receiving the requests for the right to use the bus, the root determines which node can use the bus. Only the root node can perform the arbitration process, and permit the node to use the bus that was awarded the right through arbitration.

FIG. 19B is a diagram for explaining an example where the request from node F is approved and the request from node B is rejected.

The root transmits a DP (Data Prefix) packet to the node whose request was rejected as a result of the arbitration process, and notifies the node its request has been rejected. The pertinent node holds the request for the right to use the bus until it can be submitted for the next arbitration process.

Through the use of arbitration, the 1394 network can manage the right of use of the bus.

(10) Communication Cycle

The isochronous transmission mode and the asynchronous transmission mode can coexist in each communication cycle in a time sharing manner. The time for one communication cycle is normally 125 μm.

Figure 20:
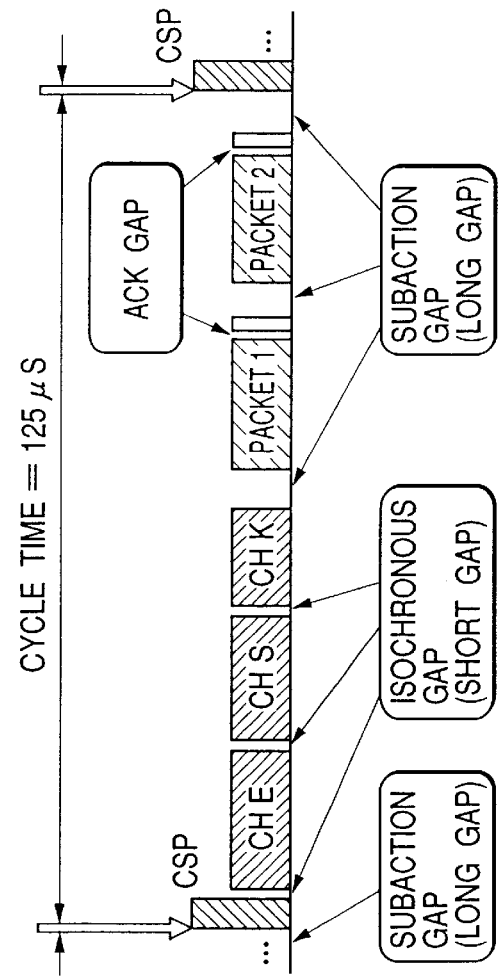
FIG. 20 is a diagram for explaining one communication cycle.

FIG. 20 is a diagram for explaining an example where the isochronous transmission mode and the asynchronous transmission mode are present in one communication cycle.

The isochronous transmission mode is performed prior to the asynchronous transmission mode. This is because, after a cycle start packet, an idle time (subaction gap) that is required to start an asynchronous transmission is longer than an idle time (isochronous gap) that is required to start an isochronous transmission. For this reason, the isochronous transmission is performed before the asynchronous transmission.

In FIG. 20, when the communication cycle is started, a cycle start packet (hereinafter referred to as a CSP) is transmitted by a specific node. The individual nodes can adjust the time by using this CSP, so that their time measurements correspond to those of the other nodes.

(11) Isochronous Transmission Mode

The isochronous transmission mode is a synchronized transmission method. The isochronous transmission mode can be performed within a predetermined period following the start of a communication cycle. In addition, the isochronous transmission mode is always executed for each cycle in order to maintain real-time transmission.

The isochronous transmission mode is especially appropriate when the real-time transmission of data, such as moving image data and audio data, is required. The isochronous transmission mode is not a one-to-one communication process like the asynchronous transmission mode, but is broadcast communication. That is, a packet output by a specific node is evenly transmitted to all the other nodes on the network. It should be noted that ack (response code for reception confirmation) is not present in an isochronous transmission.

In FIG. 20, channel e (ch e), channel s (ch s) and channel k (ch k) represent periods during which the nodes perform isochronous transmission. In order to distinguish a plurality of different isochronous transmissions, the 1394 interface provides different channel numbers. Therefore, the isochronous transmission of data among a plurality of nodes is possible. The channel number does not specify a transmission destination, and merely represents a local number for data.

The isochronous gap in FIG. 20 represents an idle state of the bus. When a predetermined time has elapsed since the idle state of the bus, a node that desires to make an isochronous transmission assumes that it can,use the bus, and initiates the arbitration.

Figure 21:
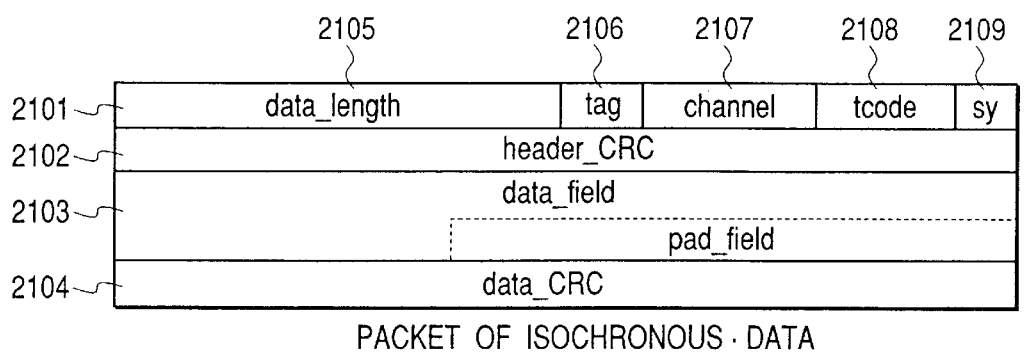
FIG. 21 is a diagram showing the format of an isochronous data packet.

The format of a communication packet to be transmitted in the isochronous transmission mode is shown in FIG. 21. Hereinafter, a communication packet to be transmitted in the isochronous transmission mode is called an isochronous packet.

In FIG. 21, the isochronous packet is constituted by a header 2101, a header CRC 2102, a data portion 2103 and a data CRC 2104.

The header 2101 includes a field 2105 used to store the length of the data portion 2103, a field 2106 used to store format information for the isochronous packet, a field 2107 used to store the channel number of the isochronous packet, a field 2108 used to store transaction code (tcode) to identify the format of a packet and a process to be performed, and a field 2109 used to store synchronization data.

(12) Asynchronous Transmission Mode

The asynchronous transmission mode is an asynchronous transmission method. The asynchronous transmission can be performed during a period following the isochronous transmission and continuing until the start of the next communication cycle, i.e., a period continuing until the CSP of the next communication cycle is transmitted.

In FIG. 20, the first subaction gap represents the idle state of the bus. When the idle time reaches a predetermined value, a node that desires asynchronous transmission assumes that it can use the bus, and initiates the arbitration.

Figure 22:
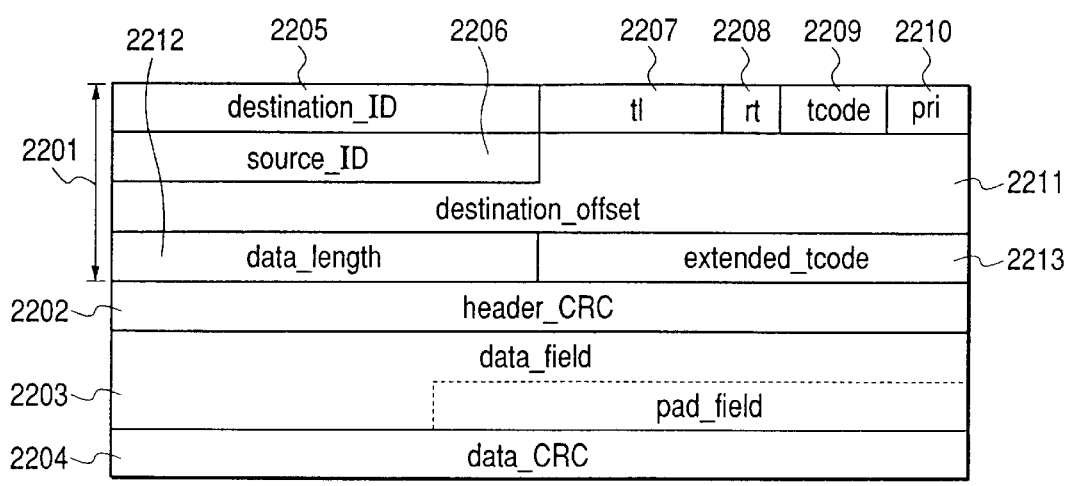
FIG. 22 is a diagram showing the format of an asynchronous data packet.

A node that obtains the right of use of the bus through arbitration transmits a packet shown in FIG. 22 to a predetermined node. Upon receiving this packet, the node returns an ack (a response code for reception confirmation, or a response packet) after the ack gap.

FIG. 22 is a diagram showing the format of a communication packet based on the asynchronous transmission mode. Hereinafter, a communication packet to be transmitted in the asynchronous transmission mode is called an asynchronous packet.

In FIG. 22, the asynchronous packet is constituted by a header 2201, a header CRC 2202, a data portion 2203 and a data CRC 2204.

The header 2201 includes a field 2205 used to store the node ID of a destination node, a field 2206 used to store the node ID of a source node, a field 2207 used to store labels that represent a series of transactions, a field 2208 used to store code indicating a re-transmission status, a field 2209 used to store transaction code (tcode) to identify the format of a packet and a process to be performed, a field 2210 used to store the priority order, a field 2211 used to store the memory address of the destination, a field 2212 used to store the length of the data portion 2203, and a field 2213 used to store extended transaction code.

The asynchronous transmission mode is a one-to-one correspondence communication transmitted by a local node to a partner node. Although a packet received from a source node is transmitted to all the other nodes on the network, each node ignores a packet that is addressed to another node. Therefore, only a destination node can read the packet.

When the time for the transmission of the next CSP is reached during the asynchronous transmission, the asynchronous transmission is not forcibly halted; the next CSP is transmitted after the transmission has been completed, Therefore, if one communication cycle takes longer than 125 μS, the next communication cycle is reduced by a length equivalent to the extended time. In this manner, the 1394 network can maintain substantially the same communication cycle.

The configuration and functions of the 1394 network have been explained.

The following methods are used to prepare a device map with which the application of the PC 112 manages the topology of the above described network: (1) a device map is prepared in accordance with topology map information provided by a bus manager, and (2) a device map is prepared in accordance with a self ID packet that is transmitted by each node after a bus reset has occurred.

According to the above methods, however, although the connection configuration with the parent-child relationship for nodes can be identified using the topology map information, the actual location of each node can not be obtained.

To resolve this problem, a method is used by which device map information is stored in a database other than the configuration ROM. With this method, however, since the access procedures for the database and the communication procedures to obtain the device map information are not in common use by the individual nodes, a better device map function can not easily be provided.

Therefore, the home network in this embodiment is constructed as follows, so that the application of the management device can provide a better device map function. (1) Device map information, such as the locations of nodes and functions supported by the nodes, is stored in a predetermined area of the configuration ROM that is constantly mounted in each node. (2) Each node provides the device map information in response to a read transaction performed by the management device.

With this arrangement, although the management device of this embodiment does not cope with access procedures and communication procedures unique to the individual nodes, the management device can obtain device map information from all the nodes. As a result, a better device map function can be easily provided.

Figure 23:
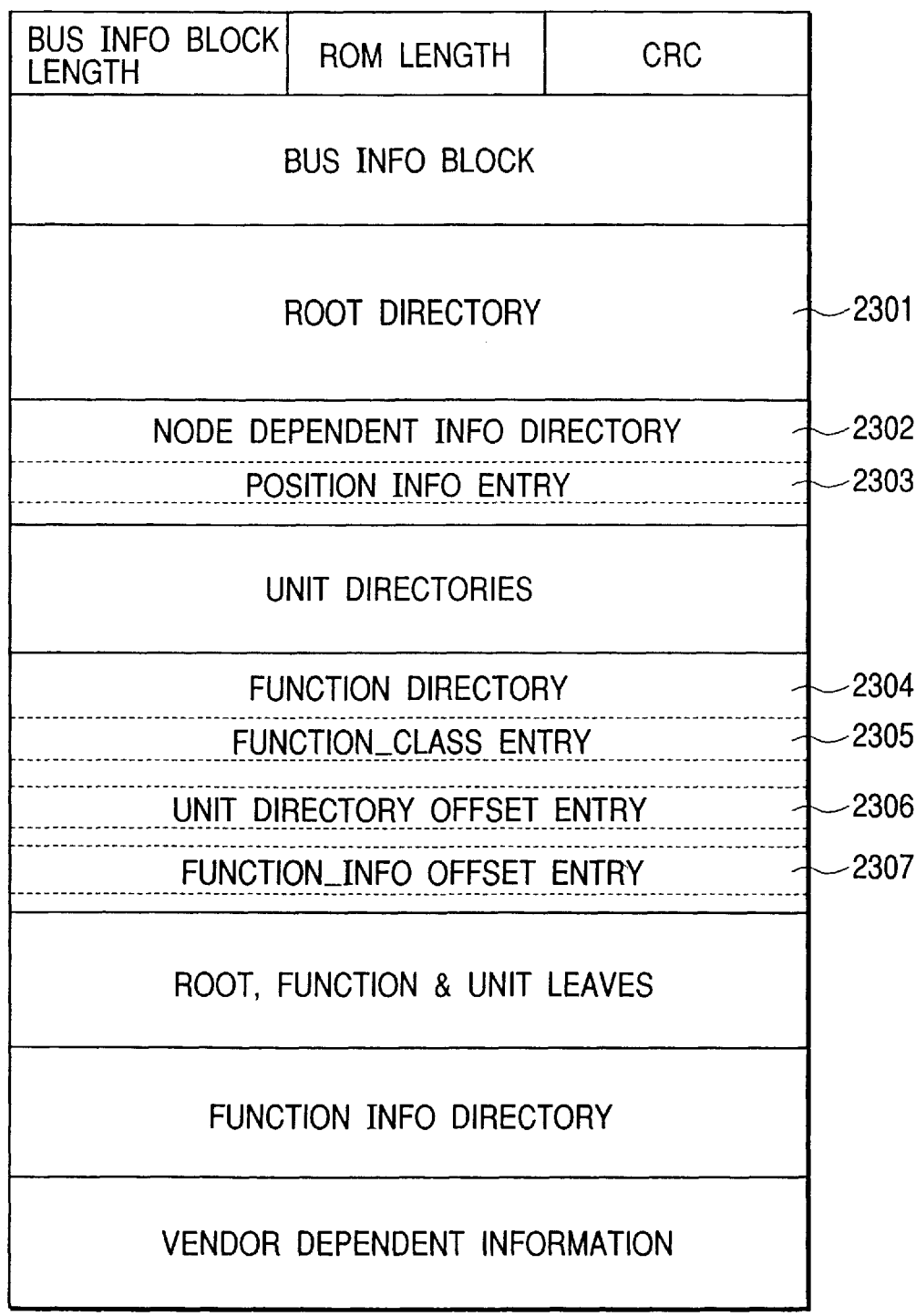
FIG. 23 is a diagram showing the structure of a configuration ROM according to the embodiment.

The structure of the configuration ROM that is included by the all the nodes in this embodiment (all the devices and all the outlets) is shown in FIG. 23.

In FIG. 23, information concerning the functions supported by the nodes (e.g., the printer function, the scanner function and the recording/reproduction function) is stored in a function directory 2304 that is offset from a root directory 2301.

The function directory 2304 includes a function category (a function class entry 2305) that is sorted in advance into classes for functions; a pointer, entered in an information area (unit directory offset entry 2306), to a directory in which is stored information concerning software that carries out supported functions, and a communication protocol that corresponds to the supported functions; and a pointer, in an information area (a function info offset entry 2307), to a directory in which is stored information unique to the supported functions.

The inherent information for a local node (e.g., the name of a company, the name of a model and position information) is stored in a node dependent info directory 2302 in the configuration ROM of each node. Particularly, in accordance with the following processing, the position information is stored as a position info entry 2303 in the node dependent info directory 2302.

The position information to be stored in the configuration ROM of each node will now be explained while referring to FIGS. 24 to 27.

Figure 24:
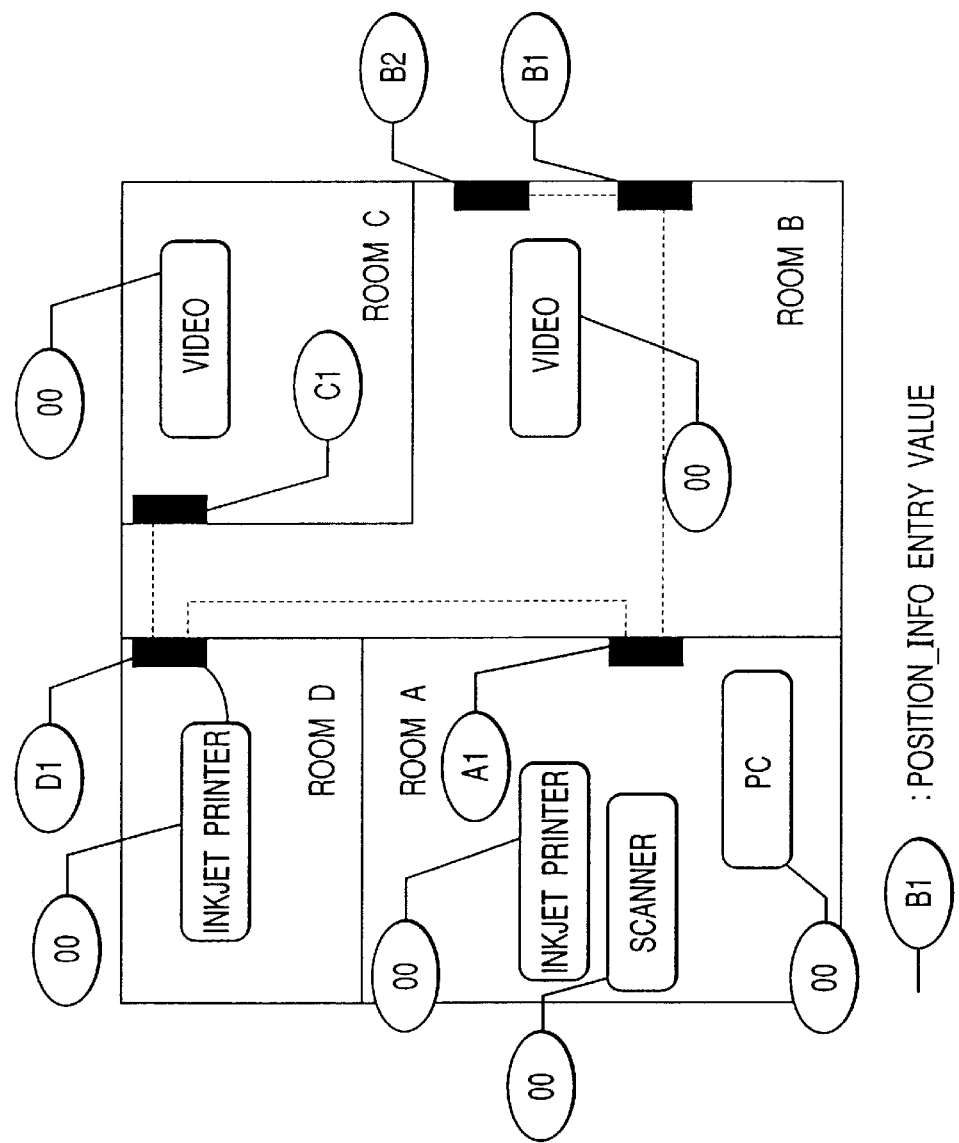
FIG. 24 is a diagram for explaining the processing performed in this embodiment for setting position information for individual nodes.

In FIG. 24, in the position info entry 2303 for the outlet 101 that is mounted in each room, a room index is written in advance when the outlet 101 is installed. The room index is never changed.

In FIG. 24, the room index for the outlet 101 in room A is A1 in the ASCII form. The room indexes for the two outlets 101 in room B are B1 and B2 in the ASCII form. Similarly, the room index for the outlet 101 in room C is C1 in the ASCII form, and the room index for the outlet 101 in room D is D1 in the ASCII form.

Data 00 which indicates that a location is unstable is stored as the initial value in the position info entry 2303 of each device that can be freely located in all the rooms. At this time, writable position information is written to the position info entry 2303 of each of the devices. When the process associated with a bus reset has been completed, a predetermined method is used to write the position information.

Figure 25:
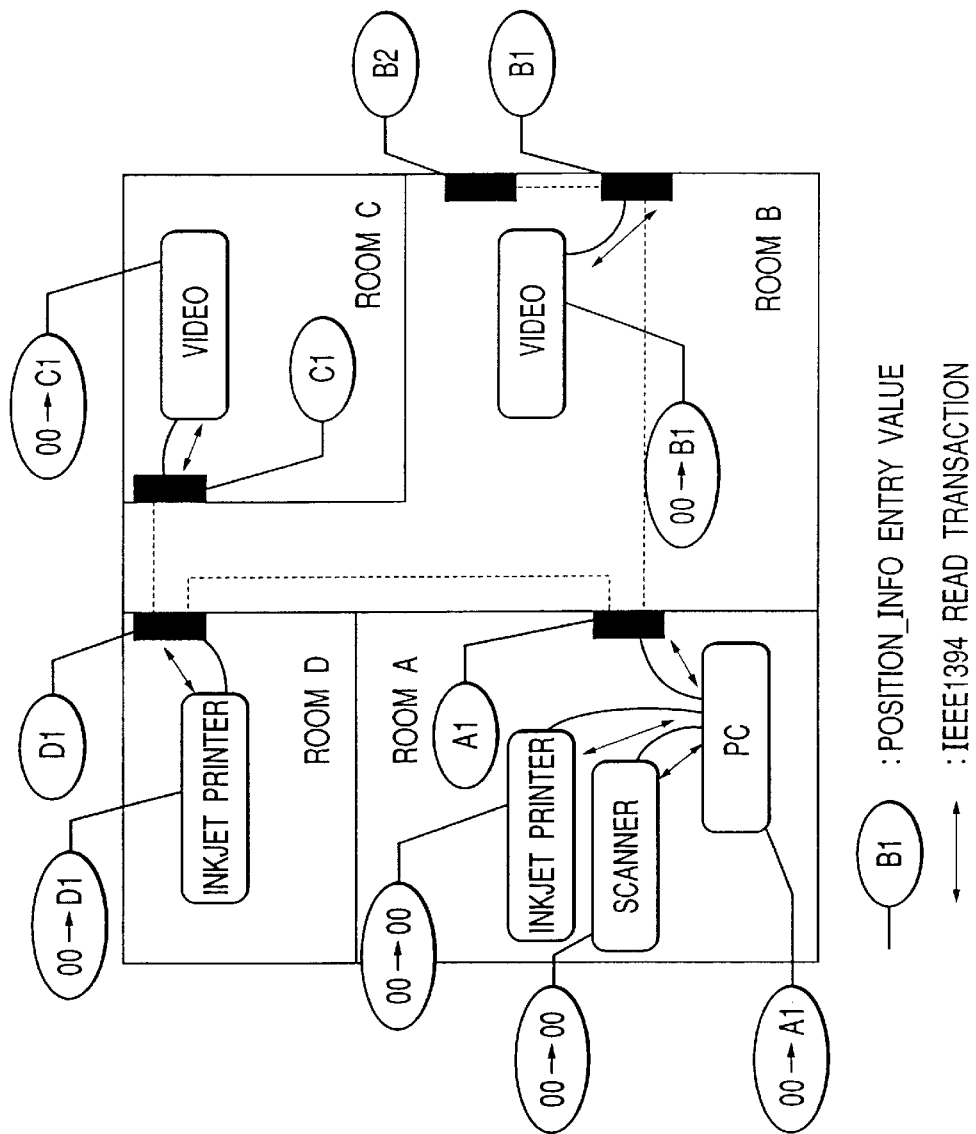
FIG. 25 is a diagram for explaining the processing performed in this embodiment for setting position information for individual nodes.
Figure 27:
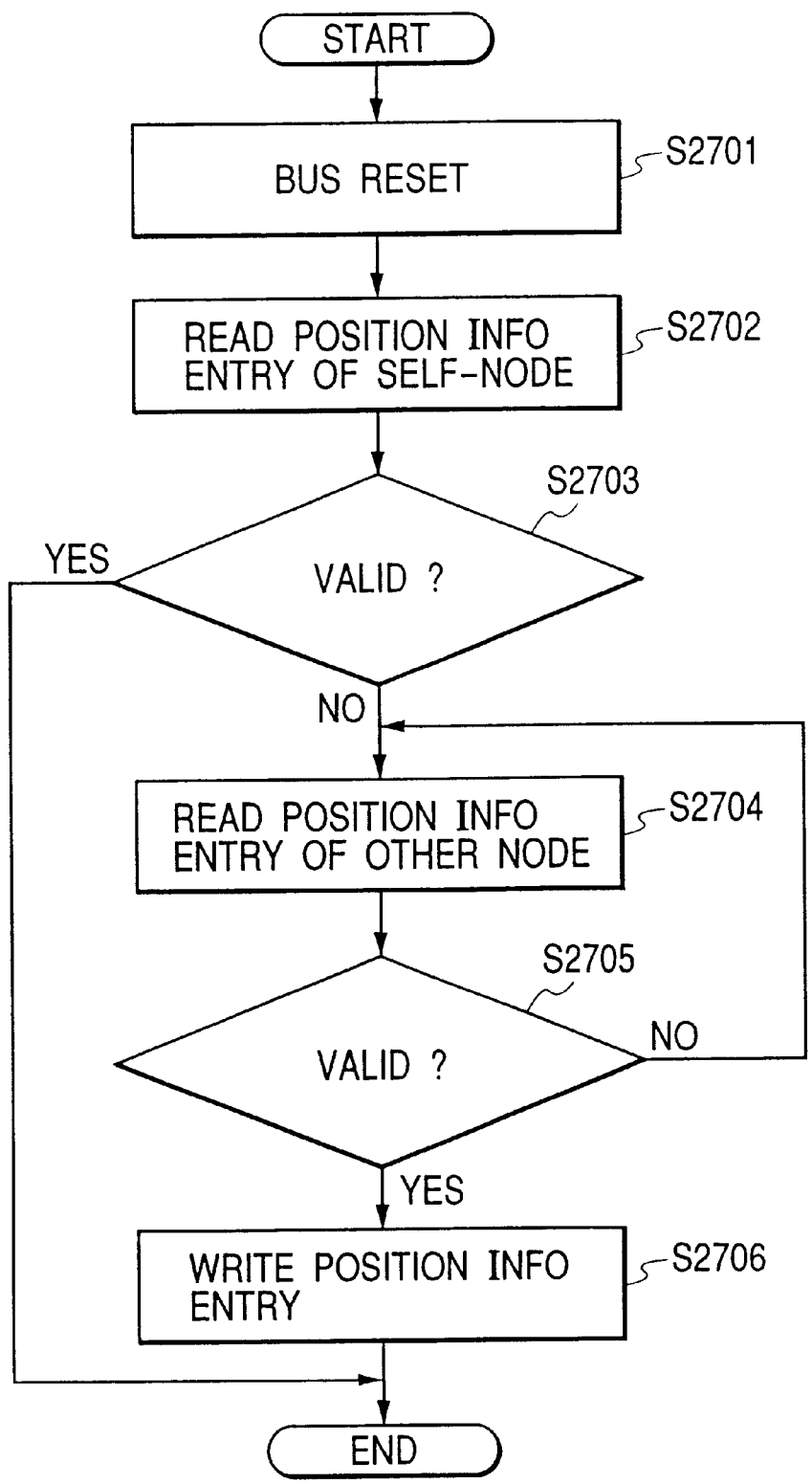
FIG. 27 is a flowchart for explaining the processing performed in this embodiment for setting position information for individual nodes.

FIG. 25 is a diagram and FIG. 27 is a flowchart for explaining the states where the devices are connected to the outlets in the rooms, or to another device.

In FIG. 25, when the devices are connected to the outlets 101 in the rooms and all the devices are turned on, the above described bus reset is begun (step S2701).

When the bus reset and the associated process (i.e., the identification of a new connection configuration and assignment of node IDs) have been completed, each device receives a self ID packet from a device that is connected directly to its communication port, and stores the information included in the packet.

Each of the devices reads position information from its position info entry 2303 (step S2702).

The device determines whether the position information is "00" (the location is unstable) (step S2703). If the position information is not "00", the device identifies the information as effective.

If the position information is "00", the device reads position information from the position info entry 2303 of a device that is connected directly to the communication port (step S2704). Each device employs the above read transaction to read the position information from the position entry 2303 in order, beginning with the connection port having the smallest port number.

In FIG. 25, for example, a device that is connected directly to the outlet 101 reads position information stored in the position info entry 2303 of the outlet 101. The PC 112 connected to the outlet 101 in room A reads room index "A1" from the position info entry 2303 of the outlet 101, and stores it in its position info entry 2303.

Similarly, room index "B1" is stored in the position info entry 2303 of the digital video 113 that is connected to the outlet 101 in room B; room index "C1" is stored in the position info entry 2303 of the digital video 114 that is connected to the outlet 101 in room C; and room index "D1" is stored in the position info entry 2303 of the inkjet printer 115 that is connected to the outlet 101 in room D.

Since in FIG. 25 position information for the PC 112 has not been initialized, the inkjet printer 110 and the scanner 111 that are connected directly to the PC 112 read the data "00" that indicate the location is unstable.

In this embodiment, if position information read from the position info entry 2303 of the nearest device is 00 (location is unstable), the pertinent device repeats the reading of a device that is connected directly to the communication port until it can read effective position information (step S2705). The results are shown in FIG. 26.

By repeating this process, the effective position information (the room index in this embodiment) is written in the position info entries 2303 of all the devices (step S2706).

Figure 26:
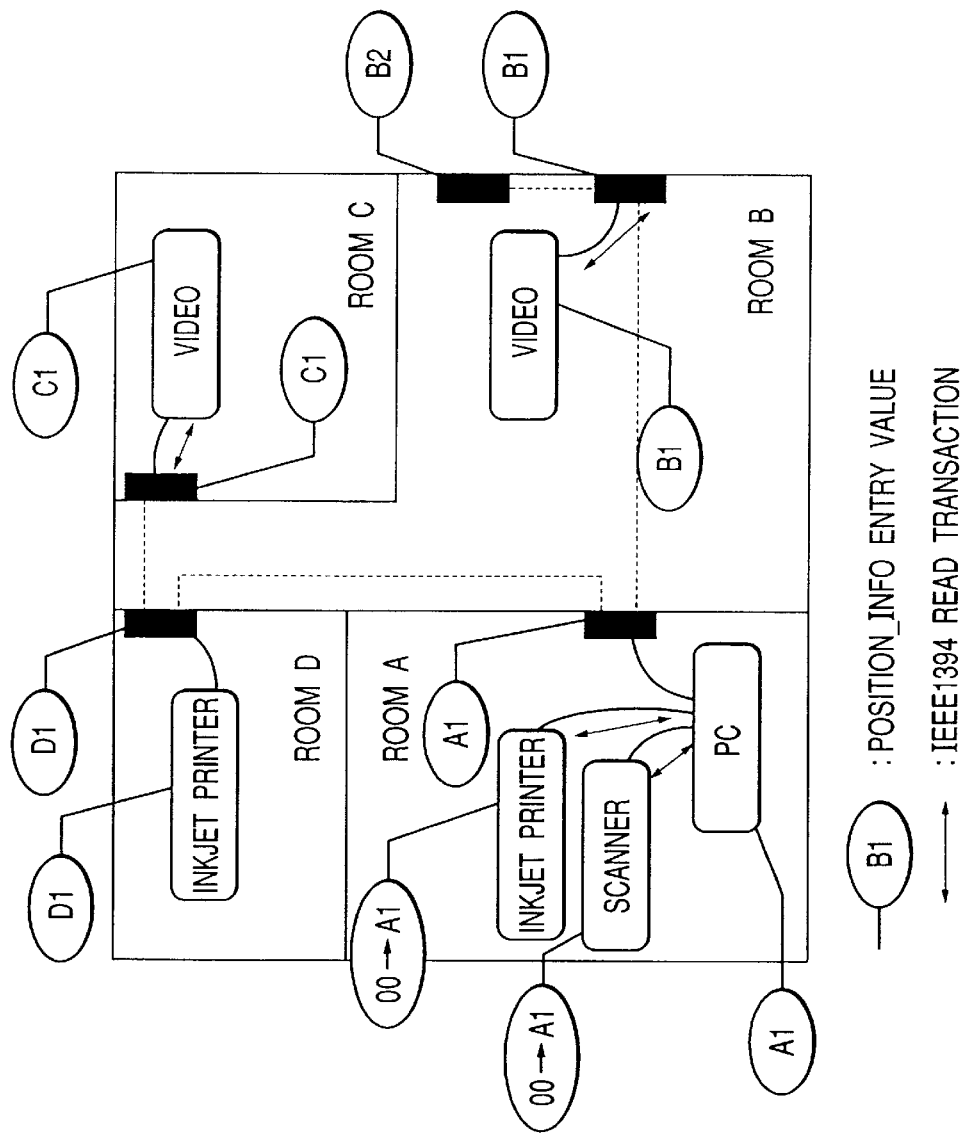
FIG. 26 is a diagram for explaining the processing performed in this embodiment for setting position information for individual nodes.

In FIG. 26, for example, the inkjet printer 110 and the scanner 111 repeat the read transaction with the PC 112 until the position information for the PC 112 is effective, i.e., until room index "A1" is stored.

Through the above process, each node can furnish its location to another node. A node whose location is not ensured reads the position information of a node that is connected directly to the communication port (i.e., the nearest node), and stores that information in a predetermined area IN the configuration ROM. As a result, the pertinent node can provide its location TO another node. Therefore, ALL the nodes that are located in the same space, e.g., in a room, can obtain the same position information.

While referring to FIGS. 28 and 29, an explanation will now be given for the device map preparation processing performed by a device map application unit in the PC 112.

Figure 28:
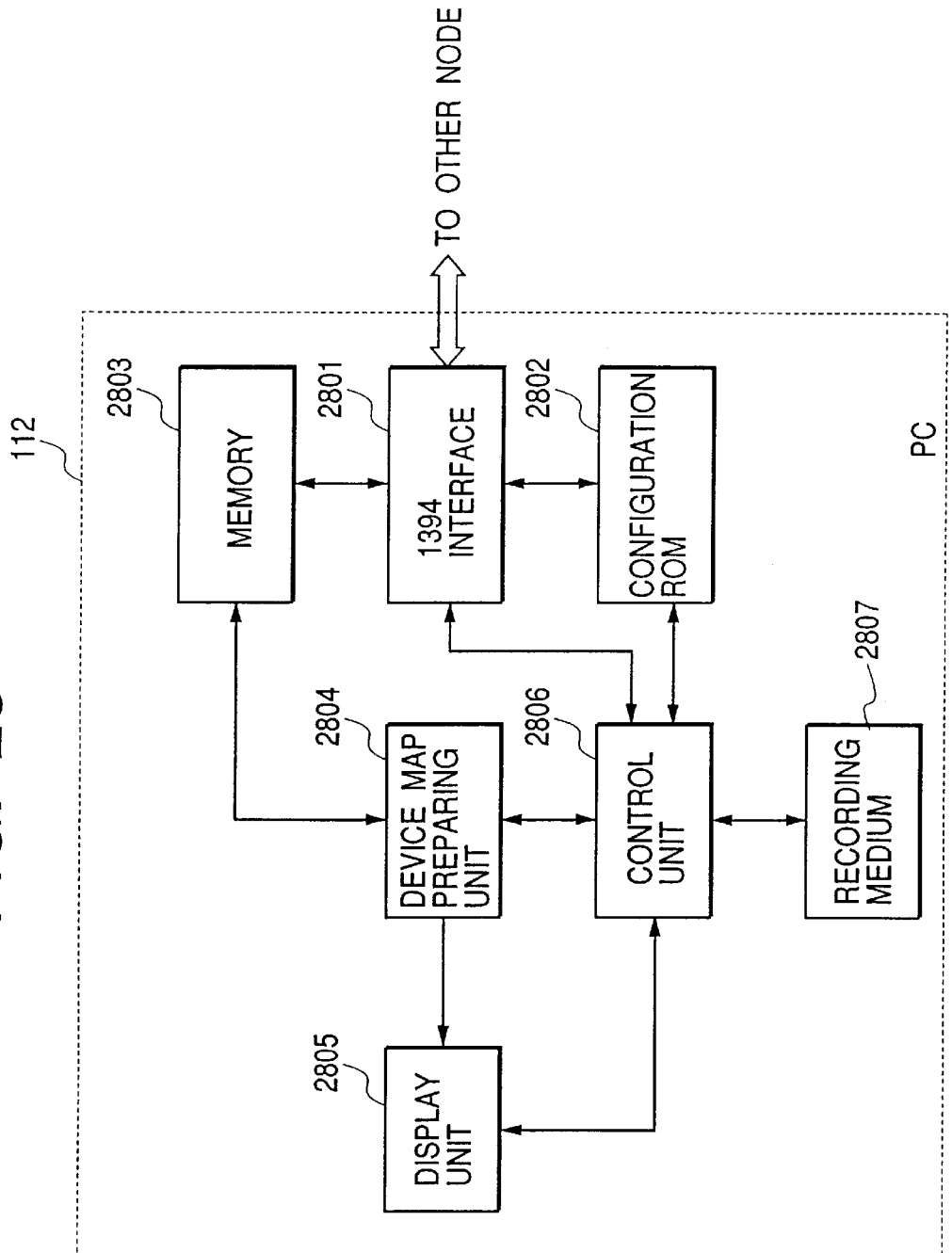
FIG. 28 is a diagram showing one arrangement of a node in this embodiment.

FIG. 28 is a diagram showing a partial arrangement for the PC 112.

In FIG. 28, a 1394 interface 2801 for the PC 112 is connected to a 1394 interface for another node. A configuration ROM 2802 in the PC 112 is constructed as in FIG. 23. A memory 2803 is used to store a table that includes information, such as position information and functional information, that is required to prepare a device map for this embodiment and to store topology information. A device map preparing unit 2804 employs the table and the topology map information to prepare a predetermined display and an icon. A display unit 2805 displays the results obtained from the device map preparing unit 2804. A control unit 2806 controls the individual sections of the PC 112. And a recording medium 2807 is used to store the device map preparation application. It should be noted that this application is stored using program code that can be read by the controller 2806.

Figure 29:
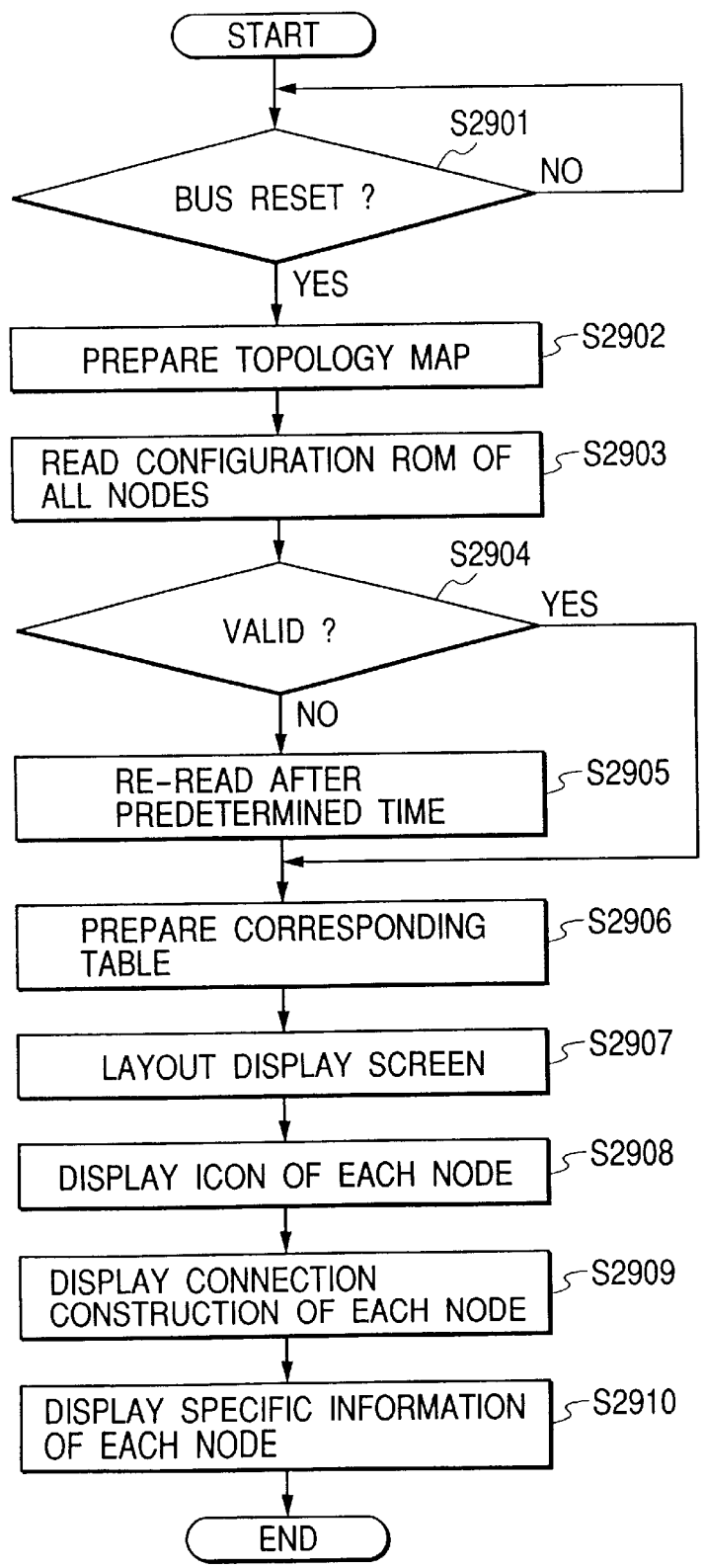
FIG. 29 is a flowchart for explaining the processing performed for preparing a device map according to the embodiment.

FIG. 29 is a flowchart showing the device map preparation processing performed by the application stored in the recording medium 2807.

The 1394 interface 2801 of the PC 112 constantly monitors the occurrence of a bus reset (step S2901).

After the bus reset is completed, the control unit 2806 of the PC 112 counts the number of devices on the network, and prepares a topology map in accordance with the topology map information provided by the bus manager, or by the self ID packet received from each node (step S2902).

After the topology map has been prepared, the device map preparation application reads data from the configuration ROM of each node in accordance with predetermined procedures (step S2903).

Figure 30:
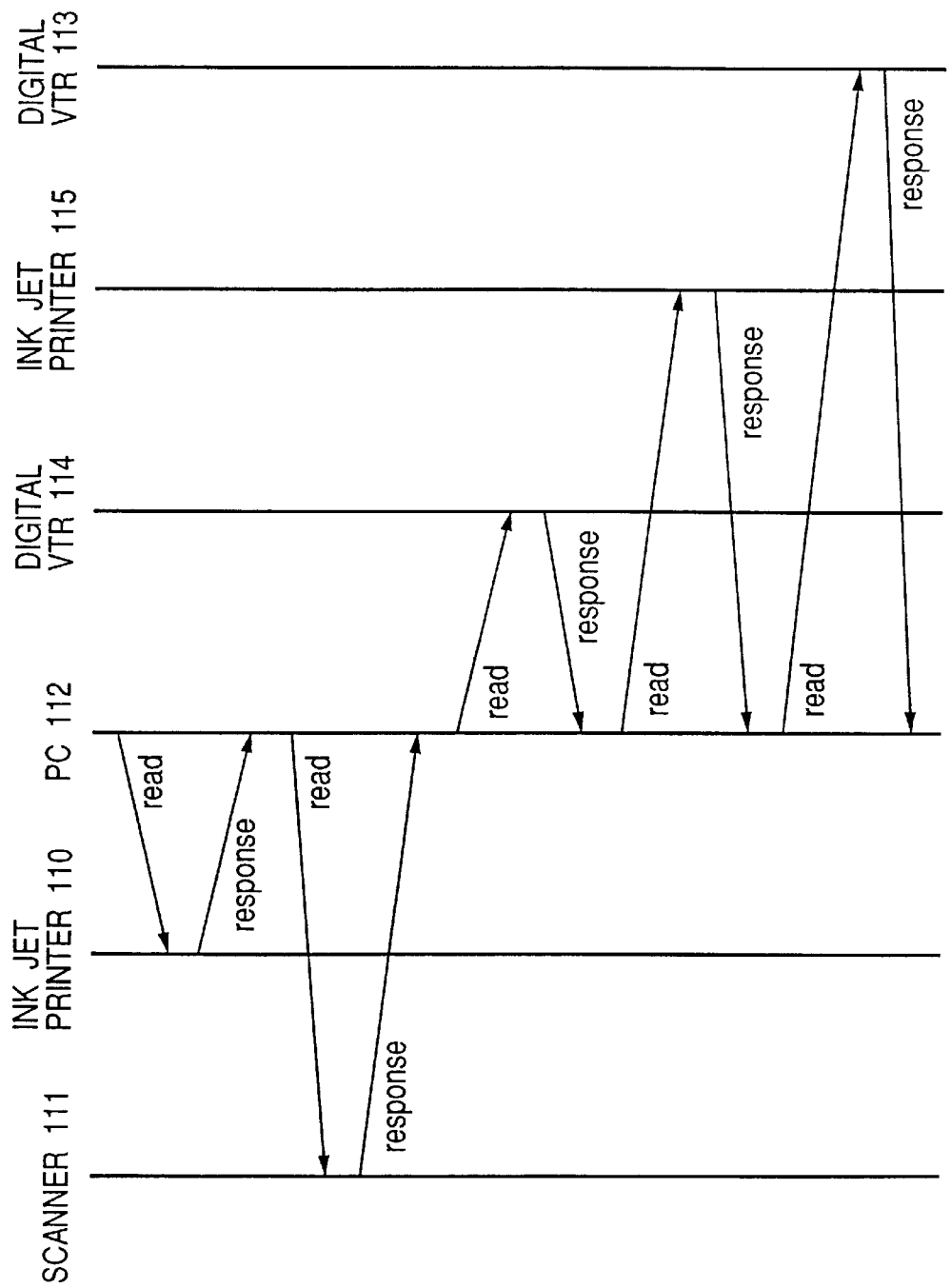
FIG. 30 is a diagram for explaining the processing performed for reading the configuration ROM of another node.

FIG. 30 is a diagram for explaining the processing when the 1394 interface of the PC 112 reads data from the configuration ROM of another node.

In FIG. 30, the 1394 interface 2801 uses the read transaction process to read data that are stored in the node dependent info directory 2303 and the function directory 2304 of the configuration ROM. The PC 112 reads data in the ascending order of the node IDs, but may read data in another arbitrary order.

The control unit 2806 of the PC 112 extracts position information from the data obtained from the nodes, and determines whether the position information represents "00" (the location is unstable) (step S2904). If the position information represents "00", the PC 112 ascertains that the position information is not effective. And when a predetermined time has elapsed, the PC 112 reads the position information for the pertinent node (step S2905).

When the reading of position information for all the devices is successful, the application prepares a table by using the node numbers of the individual nodes and their responses (step S2906). The thus prepared table is stored in the memory 2803. The contents of the table are shown in FIG. 31.

In FIG. 31, for each node, functional information for a node, a corresponding room index, and corresponding detailed information (details) are stored. The detailed information includes the name of a company, the name of a model and a supported communication protocol. The communication protocol information is, for example, the AV/C protocol for controlling the communication of AV (Audio/Visual) data, the SBP-2 (Serial Bus Protocol-2) for permitting the setting of SCSI commands, or the DPP (Direct Print Protocol) for controlling communication of a static image.

After the table is prepared, the application prepares a device map by using the device map preparing unit 2804. A device map displayed on the display unit 2805 of the PC 112 is shown in FIG. 32.

Figure 32:
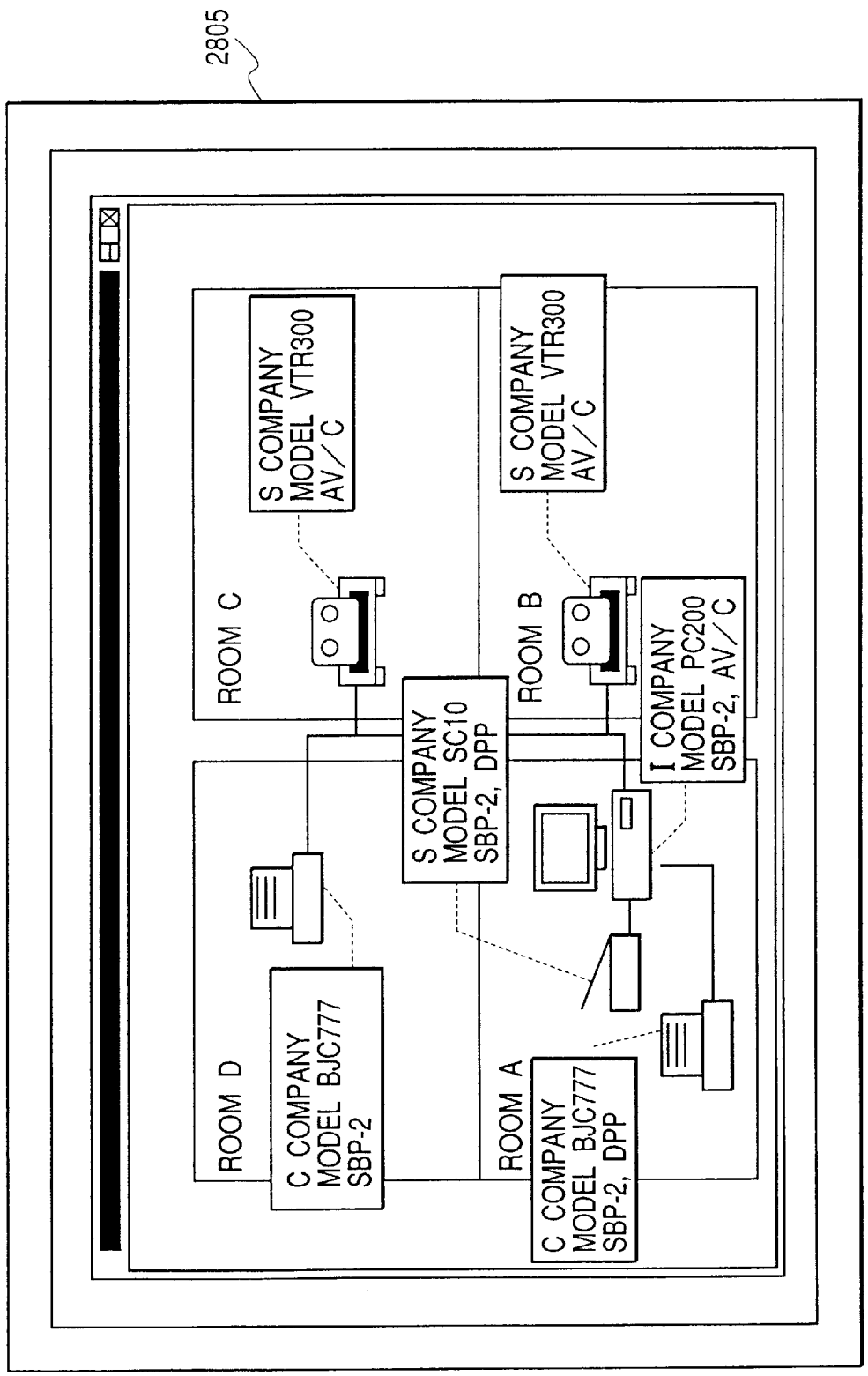
FIG. 32 is a diagram showing an example device map displayed on the monitor of a specific node according to the embodiment.

In FIG. 32, the application employs the room indexes of the table to lay out the image on the display screen, and displays spatial areas corresponding to the room indexes on the screen (step S2907).

Then, the application prepares the icons for the individual nodes based on the functional information in the table, and displays the icons in the areas that correspond to the room indexes (step S2908). It should be noted that the icons are displayed using forms that enable a user to visually identify the features of the functions.

Following this, the application employs the topology map prepared at step S2902 to display the connections of the icons that are located in the individual areas (step S2909).

Further, the application displays, together with the icons, the corresponding detailed information (the name of a company, the name of a model, protocol information, etc.) listed in the table (step S2910).

Through the above described processing, the application screen of the PC 112 can display a better device map.

According to this embodiment, since the position information and the functional information for each node are stored in a predetermined area of the configuration ROM, the process for accessing the configuration ROM and the communication process to obtain the device map information can be used in common by the individual nodes, so that a better device map function can be provided.

In addition, not only the connections of the nodes, but also nodes having the same position information can be laid out in one area on the display screen. Therefore, the locations of the individual nodes can be visually displayed, so that a better network management function can be provided for a user.

Furthermore, since the icons for nodes are prepared by using the functional information for the nodes, the functions of the nodes can be easily identified.

Further, the detailed information (the name of a company, the name of a model, supported protocol information, etc.) for the nodes can be displayed together with the icons for the nodes.

As is described above, according to the embodiment, the processing to obtain the device map information for the individual nodes can be employed in common by the nodes, and a better device map can be prepared. Thus, a better network management function can be provided for a user. Since the locations of the devices and the supported functions can be displayed visually, a desired device can be easily specified.

What is claimed is:

1. An electronic device comprising:
   a digital interface that is connectable to a node in a network, said node including first location information indicating a room where said node is located; and
   a memory that stores second location information indicating a room where said electronic device is located,
   wherein said memory is a memory for storing information about said electronic device, and
   wherein said electronic device automatically obtains said first location information from said node connected to said digital interface, and stores said first location information as said second location information in said memory.

2. An electronic device according to claim 1, wherein said digital interface is connectable to an outlet mounted in a room.

3. An electronic device according to claim 1, wherein said digital interface transmits said second location information to a request node that requests location information of said electronic device.

4. An electronic device according to claim 1, wherein said network is a home network.

5. An electronic device according to claim 1, wherein said digital interface conforms to IEEE 1394 standards.

6. An electronic device according to claim 1, wherein said electronic device automatically obtains said first location information from said node connected to said digital interface if said second location information is invalid.

7. An electronic device according to claim 6, wherein said electronic device automatically obtains said first location information from said node connected to said digital interface again if said first location information is invalid.

* * * * *

UNITED STATES PATENT AND TRADEMARK OFFICE
CERTIFICATE OF CORRECTION

PATENT NO. : 6,721,818 B1
DATED : April 13, 2004
INVENTOR(S) : Atsushi Nakamura

It is certified that error appears in the above-identified patent and that said Letters Patent is hereby corrected as shown below:

Drawings,
SHEET 6, Fig. 7, "WHETER" should read -- WHETHER --.
SHEET 13, Fig. 17, "NODE" should read -- NODES --.

Column 3,
Lines 37 and 41, "node ID:" should read -- node ID; --.

Column 4,
Line 51, ":the" should read -- the --.

Column 5,
Line 2, "Engineers." should read -- Engineers, --.
Line 54, "125 $\mu$m" should read -- 125 $\mu$S --.

Column 6,
Line 54, "Layer 305." should read -- Layer 305 --.

Column 7,
Line 48, "manger" should read -- manager --.

Column 8,
Line 4, "is" should read -- are --.
Lines 37, 38, 40 and 43, "vender" should read -- vendor --.

Column 9,
Lines 1 and 2, "vender" should read -- vendor --.
Line 10, "FIG. 1 11" should read -- FIG. 11 --.

Column 10,
Line 55, "established:" should read -- established --.

Column 11,
Line 59, "(e.e.," should read -- (e.g., --.

Column 12,
Line 6, "to" should be deleted.
Line 64, "mode" should read -- node --.

Column 13,
Line 6, "mode" should read -- node --.

UNITED STATES PATENT AND TRADEMARK OFFICE
CERTIFICATE OF CORRECTION

PATENT NO. : 6,721,818 B1
DATED : April 13, 2004
INVENTOR(S) : Atsushi Nakamura

It is certified that error appears in the above-identified patent and that said Letters Patent is hereby corrected as shown below:

Column 14,
Line 35, "manger" should read -- manager --.

Column 15,
Line 13, "125 $\mu$m" should read -- 125 $\mu$S --.
Line 60, "can,use" should read -- can use --.

Column 16,
Line 57, "completed," should read -- completed. --.

Column 18,
Line 57, "device is 00" should read -- device is "00" --.

Column 19,
Line 8, "IN" should read -- in --.
Line 9, "TO" should read -- to --.
Line 10, "ALL" should read -- all --.

Signed and Sealed this

First Day of November, 2005

JON W. DUDAS
*Director of the United States Patent and Trademark Office*